US012484796B1

(12) United States Patent
Bechtel

(10) Patent No.: US 12,484,796 B1
(45) Date of Patent: Dec. 2, 2025

(54) SYSTEM AND METHOD FOR MEASURING PULSE WAVE VELOCITY

(71) Applicant: ROCKLEY PHOTONICS LIMITED, Altrincham (GB)

(72) Inventor: Kate LeeAnn Bechtel, Pleasant Hill, CA (US)

(73) Assignee: Rockley Photonics Limited, Altrincham (GB)

( * ) Notice: Subject to any disclaimer, the term of this patent is extended or adjusted under 35 U.S.C. 154(b) by 0 days.

(21) Appl. No.: 18/991,054

(22) Filed: Dec. 20, 2024

Related U.S. Application Data

(60) Provisional application No. 63/726,217, filed on Nov. 27, 2024.

(51) Int. Cl.
*A61B 5/026* (2006.01)
*A61B 5/00* (2006.01)
*A61B 5/0285* (2006.01)
*A61B 5/0295* (2006.01)

(52) U.S. Cl.
CPC .......... *A61B 5/0261* (2013.01); *A61B 5/0285* (2013.01); *A61B 5/0295* (2013.01); *A61B 5/6824* (2013.01); *A61B 2560/0462* (2013.01); *A61B 2562/0233* (2013.01)

(58) Field of Classification Search
CPC ... A61B 5/0261; A61B 5/0285; A61B 5/0295; A61B 5/6824; A61B 2560/0462; A61B 2562/0233
See application file for complete search history.

(56) References Cited

U.S. PATENT DOCUMENTS

| 4,674,011 A | 6/1987 | Patton et al. |
| 5,243,983 A | 9/1993 | Tarr et al. |
| 5,497,769 A | 3/1996 | Gratton et al. |
| 5,532,860 A | 7/1996 | Hershey et al. |
| 5,772,587 A | 6/1998 | Gratton et al. |

(Continued)

FOREIGN PATENT DOCUMENTS

| CA | 2 861 089 C | 1/2021 |
| CN | 108709847 A | 10/2018 |

(Continued)

OTHER PUBLICATIONS

Teng, Zhongshuai et al., "In Vivo Pulse Wave Measurement Through a Multimode Fiber Diffuse Speckle Analysis System", Frontiers in Physics, Jan. 19, 2021, pp. 1-8, vol. 8, Article 613342, www.frontiersin.org.

(Continued)

*Primary Examiner* — Christopher Koharski
*Assistant Examiner* — Steven Maldonado
(74) *Attorney, Agent, or Firm* — Womble Bond Dickinson (US) LLP

(57) ABSTRACT

A system and method for measuring pulse wave velocity. In some embodiments, a system includes: a pulse timing sensor, including: a first wearable speckleplethysmography sensor; and a second wearable speckleplethysmography sensor, the first wearable speckleplethysmography sensor being configured to measure a blood flow velocity at a first point, on a first artery, and the second wearable speckleplethysmography sensor being configured to measure a blood flow velocity at a second point on a second artery.

20 Claims, 17 Drawing Sheets

(56) References Cited

U.S. PATENT DOCUMENTS

| | | |
|---|---|---|
| 5,830,132 A | 11/1998 | Robinson |
| 6,154,259 A | 11/2000 | Hargis et al. |
| 6,243,601 B1 | 6/2001 | Wist |
| 6,246,892 B1 | 6/2001 | Chance |
| 6,256,016 B1 | 7/2001 | Piot et al. |
| 6,560,478 B1 | 5/2003 | Alfano et al. |
| 6,919,549 B2 | 7/2005 | Bamji et al. |
| 7,035,679 B2 | 4/2006 | Addison et al. |
| 7,113,817 B1 | 9/2006 | Winchester, Jr. et al. |
| 7,202,466 B2 | 4/2007 | Babayoff et al. |
| 7,250,317 B2 | 7/2007 | Heideman |
| 7,295,783 B2 | 11/2007 | Singh et al. |
| 7,375,812 B2 | 5/2008 | Atia et al. |
| 7,474,407 B2 | 1/2009 | Gutin |
| 7,505,128 B2 | 3/2009 | Zribi et al. |
| 7,616,984 B2 | 11/2009 | Barbour et al. |
| 7,761,126 B2 | 7/2010 | Gardner et al. |
| 7,865,225 B2 | 1/2011 | Kaltschmidt et al. |
| 7,922,664 B2 | 4/2011 | Elliott |
| 7,925,056 B2 | 4/2011 | Presura et al. |
| 8,237,927 B1 | 8/2012 | Reeve et al. |
| 8,277,384 B2 | 10/2012 | Fine |
| 8,313,439 B2 | 11/2012 | McCombie et al. |
| 8,343,062 B2 | 1/2013 | Fortin et al. |
| 8,343,063 B2 | 1/2013 | Borgos |
| 8,376,955 B2 | 2/2013 | Baker, Jr. |
| 8,398,556 B2 | 3/2013 | Sethi et al. |
| 8,868,149 B2 | 10/2014 | Eisen et al. |
| 8,920,332 B2 | 12/2014 | Hong et al. |
| 8,923,942 B2 | 12/2014 | Bernreuter |
| 8,945,017 B2 | 2/2015 | Venkatraman et al. |
| 8,948,832 B2 | 2/2015 | Hong et al. |
| 8,956,303 B2 | 2/2015 | Hong et al. |
| 8,998,815 B2 | 4/2015 | Venkatraman et al. |
| 9,005,129 B2 | 4/2015 | Venkatraman et al. |
| 9,113,794 B2 | 8/2015 | Hong et al. |
| 9,113,795 B2 | 8/2015 | Hong et al. |
| 9,149,216 B1 | 10/2015 | Eisen et al. |
| 9,155,480 B2 | 10/2015 | Thakor et al. |
| 9,226,673 B2 | 1/2016 | Ferguson, Jr. et al. |
| 9,237,855 B2 | 1/2016 | Hong et al. |
| 9,307,917 B2 | 4/2016 | Hong et al. |
| 9,494,567 B2 | 11/2016 | Islam |
| 9,687,162 B2 | 6/2017 | Vetter et al. |
| 9,704,050 B2 | 7/2017 | Lee et al. |
| 9,730,622 B2 | 8/2017 | Eisen et al. |
| 9,772,280 B2 | 9/2017 | Cerussi et al. |
| 9,804,027 B2 | 10/2017 | Fish et al. |
| 9,846,126 B2 | 12/2017 | Gunn, III et al. |
| 9,848,787 B2 | 12/2017 | White et al. |
| 9,851,298 B1 | 12/2017 | Isikman et al. |
| 9,877,681 B2 | 1/2018 | Silverman |
| 9,931,040 B2 | 4/2018 | Homyk et al. |
| 9,970,955 B1 | 5/2018 | Homyk et al. |
| 10,004,406 B2 | 6/2018 | Yuen et al. |
| 10,058,256 B2 | 8/2018 | Chen et al. |
| 10,178,959 B1 | 1/2019 | Homyk et al. |
| 10,178,973 B2 | 1/2019 | Venkatraman et al. |
| 10,194,808 B1 * | 2/2019 | Thompson ............ A61B 5/026 |
| 10,206,576 B2 | 2/2019 | Shcherbakov et al. |
| 10,215,698 B2 | 2/2019 | Han et al. |
| 10,241,033 B2 | 3/2019 | Uematsu et al. |
| 10,271,740 B2 | 4/2019 | Ward et al. |
| 10,314,532 B2 | 6/2019 | Ward et al. |
| 10,326,035 B2 | 6/2019 | Lu et al. |
| 10,326,036 B2 | 6/2019 | Sweeney et al. |
| 10,349,847 B2 | 7/2019 | Kwon et al. |
| 10,352,768 B2 | 7/2019 | Simpkin et al. |
| 10,357,165 B2 | 7/2019 | Yoon |
| 10,420,498 B1 | 9/2019 | Horstmeyer et al. |
| 10,422,693 B2 | 9/2019 | Fish et al. |
| 10,451,537 B2 | 10/2019 | Nakaji |
| 10,463,286 B2 | 11/2019 | Schenkman et al. |
| 10,492,684 B2 | 12/2019 | Khachaturian et al. |
| 10,506,926 B2 | 12/2019 | Khachaturian et al. |
| 10,506,955 B2 | 12/2019 | Tholl et al. |
| 10,568,527 B2 | 2/2020 | Yoon et al. |
| 10,588,519 B2 | 3/2020 | Yuen et al. |
| 10,602,987 B2 | 3/2020 | Khachaturian et al. |
| 10,627,849 B1 | 4/2020 | Scofield et al. |
| 10,641,962 B2 | 5/2020 | Nykänen et al. |
| 10,643,903 B2 | 5/2020 | Drake et al. |
| 10,667,688 B2 | 6/2020 | Khachaturian et al. |
| 10,677,989 B2 | 6/2020 | Abediasl et al. |
| 10,681,259 B2 | 6/2020 | Ichiki et al. |
| 10,681,283 B2 | 6/2020 | Nakashima et al. |
| 10,694,997 B2 | 6/2020 | Kim et al. |
| 10,718,668 B2 | 7/2020 | Gu et al. |
| 10,722,177 B2 | 7/2020 | Homyk et al. |
| 10,739,256 B1 | 8/2020 | Rickman et al. |
| 10,750,956 B2 | 8/2020 | Zalevsky et al. |
| 10,775,239 B2 | 9/2020 | Lee et al. |
| 10,813,597 B2 | 10/2020 | Rice et al. |
| 10,820,858 B2 | 11/2020 | Yoon et al. |
| 10,842,422 B2 | 11/2020 | Yu et al. |
| 10,871,503 B1 | 12/2020 | Homyk et al. |
| 10,895,525 B2 | 1/2021 | Swanson |
| 10,966,616 B2 | 4/2021 | De Morree et al. |
| 10,973,422 B2 | 4/2021 | Pantelopoulos et al. |
| 11,022,751 B2 | 6/2021 | Bauters et al. |
| 11,045,103 B2 | 6/2021 | Shchekin et al. |
| 11,079,364 B2 | 8/2021 | Leger et al. |
| 11,096,601 B2 | 8/2021 | Hong et al. |
| 11,096,608 B2 | 8/2021 | Van Dorpe et al. |
| 11,129,544 B2 | 9/2021 | Zalevsky et al. |
| 11,202,582 B2 | 12/2021 | Verkruijsse et al. |
| 11,213,217 B2 | 1/2022 | Han et al. |
| 11,278,220 B2 | 3/2022 | Tucker et al. |
| 11,298,035 B2 | 4/2022 | Huijbregts et al. |
| 11,369,275 B2 | 6/2022 | Song et al. |
| 11,445,922 B2 | 9/2022 | Naima |
| 11,553,851 B2 | 1/2023 | Kim et al. |
| 11,583,185 B2 | 2/2023 | Homyk et al. |
| 11,666,238 B2 | 6/2023 | Rege et al. |
| 11,666,277 B2 | 6/2023 | Yoon et al. |
| 11,684,281 B2 | 6/2023 | Pantelopoulos et al. |
| 11,690,513 B2 | 7/2023 | Hu et al. |
| 11,696,693 B2 | 7/2023 | Wong |
| 11,709,120 B2 | 7/2023 | Rice et al. |
| 11,744,491 B2 | 9/2023 | Dunn et al. |
| 11,751,811 B2 | 9/2023 | Sun et al. |
| 11,759,116 B2 | 9/2023 | White et al. |
| 11,759,121 B2 | 9/2023 | Mccann et al. |
| 11,771,343 B2 | 10/2023 | Sacha |
| 11,800,990 B2 | 10/2023 | White et al. |
| 11,857,301 B1 | 1/2024 | Homyk et al. |
| 11,883,134 B2 | 1/2024 | Leabman |
| 11,890,081 B2 | 2/2024 | Jang |
| 11,980,451 B2 | 5/2024 | Albert |
| 12,109,006 B2 | 10/2024 | Dunn et al. |
| 2002/0195496 A1 | 12/2002 | Tsikos et al. |
| 2003/0052169 A1 | 3/2003 | Tsikos et al. |
| 2003/0137669 A1 | 7/2003 | Rollins et al. |
| 2005/0249509 A1 | 11/2005 | Nagarajan et al. |
| 2006/0124829 A1 | 6/2006 | Song et al. |
| 2006/0132790 A1 | 6/2006 | Gutin |
| 2006/0204175 A1 | 9/2006 | Laurent-Lund et al. |
| 2006/0247514 A1 | 11/2006 | Panasyuk et al. |
| 2007/0051601 A1 | 3/2007 | Wang et al. |
| 2007/0057182 A1 | 3/2007 | Feuerbaum |
| 2007/0093702 A1 | 4/2007 | Yu et al. |
| 2008/0097172 A1 | 4/2008 | Sawada et al. |
| 2008/0154126 A1 | 6/2008 | Culver et al. |
| 2008/0204752 A1 | 8/2008 | Dorvee et al. |
| 2008/0220512 A1 | 9/2008 | Koh et al. |
| 2008/0316567 A1 | 12/2008 | Grasser et al. |
| 2009/0177094 A1 | 7/2009 | Brown et al. |
| 2009/0202251 A1 | 8/2009 | Shibayama |
| 2009/0209834 A1 | 8/2009 | Fine |
| 2009/0284748 A1 | 11/2009 | Melman et al. |
| 2010/0004741 A1 | 1/2010 | Gupta et al. |
| 2010/0046234 A1 | 2/2010 | Abu-Ageel |
| 2010/0056928 A1 | 3/2010 | Zuzak et al. |
| 2010/0226646 A1 | 9/2010 | Chan et al. |

(56) References Cited

U.S. PATENT DOCUMENTS

| | | |
|---|---|---|
| 2011/0054277 A1 | 3/2011 | Pinter et al. |
| 2011/0082355 A1 | 4/2011 | Eisen et al. |
| 2011/0087108 A1 | 4/2011 | Onoe et al. |
| 2011/0196244 A1 | 8/2011 | Ribas Ripoll et al. |
| 2012/0130215 A1 | 5/2012 | Fine et al. |
| 2012/0232402 A1 | 9/2012 | MacFarlane et al. |
| 2013/0131475 A1 | 5/2013 | Eisen et al. |
| 2013/0190630 A1 | 7/2013 | Borgos |
| 2013/0204112 A1 | 8/2013 | White et al. |
| 2013/0278631 A1 | 10/2013 | Border et al. |
| 2014/0094666 A1 | 4/2014 | Fine |
| 2014/0118695 A1 | 5/2014 | Shimada et al. |
| 2014/0120319 A1 | 5/2014 | Joseph |
| 2014/0200423 A1 | 7/2014 | Eisen et al. |
| 2014/0313524 A1 | 10/2014 | Banyay et al. |
| 2014/0316286 A1 | 10/2014 | Addison et al. |
| 2014/0376001 A1 | 12/2014 | Swanson |
| 2015/0157224 A1 | 6/2015 | Carmon et al. |
| 2015/0196251 A1 | 7/2015 | Outwater et al. |
| 2015/0201854 A1 | 7/2015 | Hong et al. |
| 2015/0323311 A1 | 11/2015 | Muijs et al. |
| 2016/0066790 A1 | 3/2016 | Shcherbakov et al. |
| 2016/0106327 A1 | 4/2016 | Yoon et al. |
| 2016/0157736 A1 | 6/2016 | Huang et al. |
| 2016/0161685 A1 | 6/2016 | Xu et al. |
| 2016/0183882 A1 | 6/2016 | Henley et al. |
| 2016/0195473 A1 | 7/2016 | Fujiwara et al. |
| 2016/0242647 A1 | 8/2016 | Ishii et al. |
| 2016/0266337 A1 | 9/2016 | Feng |
| 2016/0278676 A1 | 9/2016 | Eisen et al. |
| 2016/0282265 A1 | 9/2016 | Su et al. |
| 2016/0287107 A1 | 10/2016 | Szabados et al. |
| 2016/0360966 A1 | 12/2016 | Ishii et al. |
| 2017/0007138 A1 | 1/2017 | Kim et al. |
| 2017/0014037 A1 | 1/2017 | Coppola et al. |
| 2017/0065184 A1 | 3/2017 | Barak |
| 2017/0105618 A1 | 4/2017 | Schmoll et al. |
| 2017/0108439 A1 | 4/2017 | Stievater et al. |
| 2017/0138789 A1 | 5/2017 | Ivanov |
| 2017/0164878 A1 | 6/2017 | Connor |
| 2017/0188851 A1 | 7/2017 | LeBoeuf et al. |
| 2017/0231513 A1 | 8/2017 | Presura et al. |
| 2017/0315292 A1 | 11/2017 | Mullen et al. |
| 2018/0020962 A1 | 1/2018 | Yu et al. |
| 2018/0045566 A1 | 2/2018 | Fish et al. |
| 2018/0110423 A1 | 4/2018 | Presura et al. |
| 2018/0160913 A1 | 6/2018 | Fine |
| 2018/0202927 A1 | 7/2018 | Isikman et al. |
| 2018/0228363 A1 | 8/2018 | Frisken et al. |
| 2018/0238794 A1 | 8/2018 | Kangas et al. |
| 2018/0263519 A1 | 9/2018 | Gu |
| 2018/0283950 A1 | 10/2018 | Ge et al. |
| 2018/0296168 A1 | 10/2018 | Rice et al. |
| 2019/0041736 A1 | 2/2019 | Grunnet-Jepsen et al. |
| 2019/0046056 A1 | 2/2019 | Khachaturian et al. |
| 2019/0053721 A1 | 2/2019 | Boas et al. |
| 2019/0094009 A1 | 3/2019 | Aizawa et al. |
| 2019/0094564 A1 | 3/2019 | Rivera et al. |
| 2019/0167118 A1 | 6/2019 | Vilenskii et al. |
| 2019/0175030 A1 | 6/2019 | Verkruijsse et al. |
| 2019/0336006 A1 | 11/2019 | Horstmeyer et al. |
| 2019/0343442 A1 | 11/2019 | Aung et al. |
| 2019/0343456 A1 | 11/2019 | Kahlert et al. |
| 2019/0369650 A1 | 12/2019 | Swanson et al. |
| 2019/0387972 A1 | 12/2019 | Hu et al. |
| 2019/0391243 A1 | 12/2019 | Nicolaescu |
| 2019/0391702 A1 | 12/2019 | Jo et al. |
| 2020/0003619 A1 | 1/2020 | Hu et al. |
| 2020/0011995 A1 | 1/2020 | Send et al. |
| 2020/0069225 A1 | 3/2020 | Vizbaras et al. |
| 2020/0100705 A1* | 4/2020 | Dellimore ............ A61B 5/1118 |
| 2020/0143534 A1 | 5/2020 | Wright et al. |
| 2020/0158548 A1 | 5/2020 | Rice et al. |
| 2020/0196874 A1 | 6/2020 | Rozental et al. |
| 2020/0214602 A1 | 7/2020 | Narumi et al. |
| 2020/0237272 A1 | 7/2020 | Lin et al. |
| 2020/0249492 A1 | 8/2020 | Maes |
| 2020/0323440 A1* | 10/2020 | Galeev ............... A61B 5/02438 |
| 2020/0359948 A1 | 11/2020 | Dunn et al. |
| 2020/0397351 A1 | 12/2020 | Miyata |
| 2021/0000385 A1 | 1/2021 | Warren et al. |
| 2021/0022623 A1 | 1/2021 | Rice et al. |
| 2021/0028602 A1 | 1/2021 | Cao et al. |
| 2021/0161408 A1 | 6/2021 | Wakita |
| 2021/0267471 A1 | 9/2021 | Bonomi et al. |
| 2021/0321887 A1 | 10/2021 | Fukazawa et al. |
| 2021/0330202 A1 | 10/2021 | Konecky |
| 2021/0338083 A1* | 11/2021 | Sie ....................... A61B 5/6803 |
| 2021/0386310 A1 | 12/2021 | Hong et al. |
| 2021/0405518 A1 | 12/2021 | Lablans |
| 2022/0015649 A1 | 1/2022 | Ikuta et al. |
| 2022/0018762 A1 | 1/2022 | Ekin et al. |
| 2022/0019861 A1 | 1/2022 | Durr et al. |
| 2022/0039679 A1 | 2/2022 | Califa et al. |
| 2022/0061644 A1 | 3/2022 | Fontaine et al. |
| 2022/0104822 A1 | 4/2022 | Shelton, IV et al. |
| 2022/0117557 A1 | 4/2022 | Hsu et al. |
| 2022/0196557 A1 | 6/2022 | Zheng et al. |
| 2022/0265158 A1 | 8/2022 | Tokura |
| 2022/0370010 A1 | 11/2022 | Zilkie et al. |
| 2022/0413143 A1 | 12/2022 | Parsa et al. |
| 2023/0003938 A1 | 1/2023 | Zilkie et al. |
| 2023/0039055 A1 | 2/2023 | Gardner et al. |
| 2023/0048766 A1 | 2/2023 | Frey |
| 2023/0064006 A1 | 3/2023 | Kim et al. |
| 2023/0087295 A1 | 3/2023 | Dunn et al. |
| 2023/0148885 A1* | 5/2023 | Bechtel ............. A61B 5/00591 |
| 2023/0148886 A1 | 5/2023 | Bechtel et al. |
| 2023/0164444 A1 | 5/2023 | Yang |
| 2023/0225643 A1 | 7/2023 | Scofield et al. |
| 2023/0277062 A1 | 9/2023 | Dalvi et al. |
| 2023/0277075 A1 | 9/2023 | Pantelopoulos et al. |
| 2023/0296510 A1 | 9/2023 | Xu |
| 2023/0320598 A1 | 10/2023 | Khine et al. |
| 2023/0347029 A1 | 11/2023 | Corso et al. |
| 2023/0375525 A1 | 11/2023 | Merritt et al. |
| 2023/0397818 A1 | 12/2023 | Newhouse et al. |
| 2023/0401747 A1 | 12/2023 | Dunn et al. |
| 2024/0032790 A1 | 2/2024 | Patel et al. |
| 2024/0041342 A1 | 2/2024 | Lai et al. |
| 2024/0074667 A1 | 3/2024 | Rick et al. |
| 2024/0108289 A1 | 4/2024 | Bechtel et al. |
| 2024/0115212 A1 | 4/2024 | Jang |
| 2024/0156355 A1 | 5/2024 | O'Brien et al. |
| 2024/0298907 A1 | 9/2024 | Bechtel et al. |
| 2024/0350019 A1 | 10/2024 | Pery-Shechter et al. |
| 2025/0025058 A1 | 1/2025 | Bechtel et al. |
| 2025/0169696 A1 | 5/2025 | Dunn et al. |

FOREIGN PATENT DOCUMENTS

| | | |
|---|---|---|
| CN | 110301896 B | 10/2019 |
| CN | 211094079 U | 7/2020 |
| CN | 211131004 U | 7/2020 |
| CN | 112639582 A | 4/2021 |
| CN | 114466549 A | 5/2022 |
| EP | 3 002 568 A1 | 4/2016 |
| EP | 2 395 958 B1 | 12/2017 |
| EP | 3 384 841 A1 | 10/2018 |
| EP | 3 558 119 B1 | 11/2020 |
| EP | 3 886 686 A0 | 10/2021 |
| EP | 3 903 676 A1 | 11/2021 |
| WO | WO 2018/029123 A1 | 2/2018 |
| WO | WO 2019/149815 A1 | 8/2019 |
| WO | WO 2019/233903 A1 | 12/2019 |
| WO | WO 2020/030641 A1 | 2/2020 |
| WO | WO 2020/114989 A1 | 6/2020 |
| WO | WO 2021/058338 A1 | 4/2021 |
| WO | WO 2021/094473 A1 | 5/2021 |
| WO | WO 2021/116766 A1 | 6/2021 |
| WO | WO 2021/116766 A8 | 6/2021 |
| WO | WO 2023/031927 A1 | 3/2023 |

(56) References Cited

FOREIGN PATENT DOCUMENTS

| WO | WO 2023/245149 A2 | 12/2023 | |
|---|---|---|---|
| WO | WO 2024/052289 A1 | 3/2024 | |
| WO | WO 2024173585 A1 * | 8/2024 | ........... A61B 5/0261 |

OTHER PUBLICATIONS

Apsel, S. et al., "Rolling-Shutter Laser Speckle Analysis in Bio-Photonics", Proc. of SPIE, Jun. 20, 2024, pp. 130060U-1-130060U-4, vol. 13006, SPIE.
International Search Report and Written Opinion of the International Searching Authority, mailed May 14, 2025, corresponding to PCT/IB2025/000071, 15 pages.
Nabeel, P. M. et al., "Local Pulse Wave Velocity: Theory, Methods, Advancements, and Clinical Applications", IEEE Reviews in Biomedical Engineering, Jul. 29, 2019, pp. 74-112, vol. 13, IEEE.
Qiu, J. et al., "Correcting speckle contrast at small speckle size to enhance signal to noise ratio for laser speckle contrast imaging", Optics Express, Nov. 15, 2013, pp. 28902-28913, vol. 21, No. 23, Optical Society of America.
Akram, M. N. et al., "Laser speckle reduction due to spatial and angular diversity introduced by fast scanning micromirror", Applied Optics, Jun. 4, 2010, pp. 3297-3304, vol. 49, No. 17, Optical Society of America.
Abookasis, D. et al., Feasibility study of hidden flow imaging based on laser speckle technique using multiperspectives contrast images, Optics and Lasers in Engineering, 2014, pp. 38-45.
Baek, H. J. et al., "The Effect of Optical Crosstalk on Accuracy of Reflectance-Type Pulse Oximeter for Mobile Healthcare", Journal of Healthcare Engineering, Oct. 21, 2018, 9 pages, vol. 2018, Article ID 3521738, Hindawi, https://doi.org/10.1155/2018/3521738.
Baets, R. et al., "Spectroscopy-on-chip applications of silicon photonics", Proc. Of SPIE, 2013, pp. 862701-1 through 862701-10, vol. 8627, SPIE.
Berger, A. J. et al., "Feasibility of measuring blood glucose concentration by near-infrared Raman spectroscopy", Spectrochimica Acta Part A, 1997, pp. 287-292, Elsevier Science B.V.
Bi, R. et al., "A speckle-based method for fast blood flow measurement in deep tissue", Proceedings of SPIE, Optical Biopsy XIX: Toward Real-Time Spectroscopic Imaging and Diagnosis, Mar. 5, 2021, pp. 1163606-1 through 1163606-5, vol. 11636, SPIE.
Bi, R. et al., "Fast pulsatile blood flow measurement in deep tissue through a multimode detection fiber", Journal of Biomedical Optics, May 13, 2020, pp. 055003-1 through 055003-10, vol. 25(5), SPIE.
Biswas, A. et al., "Fast diffuse correlation spectroscopy with a low-cost, fiber-less embedded diode laser", Biomedical Optics Express, Oct. 4, 2021, pp. 6686-6700, vol. 12, No. 11, Optical Society of America.
Brouckaert, J. et al., "Silicon-on-Insulator Microspectrometer", Proceedings Symposium IEEE/LEOS Benelux Chapter, 2008, pp. 7-10, IEEE.
Cole, D. B. et al., "Integrated heterodyne interferometer with on-chip modulators and detectors", Optics Letters, Jun. 25, 2015, pp. 3097-3100, vol. 40, No. 13, Optical Society of America.
Epping, J. P. et al., "High power, tunable, narrow linewidth dual gain hybrid laser", Laser Congress, Oct. 3, 2019, pp. 1-2.
European Patent Office Communication pursuant to Rule 114(2) EPC, for Patent Application No. 22776935.3, mailed Aug. 9, 2024, 6 pages.
Fu, D. et al., "In Vivo Metabolic Fingerprinting of Neutral Lipids with Hyperspectral Stimulated Raman Scattering Microscopy", Journal of the American Chemical Society, May 28, 2014, pp. 8820-8828, American Chemical Society Publications.
Fukui, T. et al., "Single-Pixel Imaging Using Multimode Fiber and Silicon Photonic Phased Array", Journal of Lightwave Technology, Jul. 14, 2020, pp. 839-844, vol. 39, No. 3, IEEE.
Ge, Z. et al., "Dynamic laser speckle analysis using the event sensor", Applied Optics, Dec. 23, 2020, pp. 172-178, vol. 60, No. 1, Optical Society of America.
Ghijsen, M. et al., "Wearable speckle plethysmography (SPG) for characterizing microvascular flow and resistance", Biomedical Optics Express, Jul. 30, 2018, pp. 3937-3952, vol. 9, No. 8, Optical Society of America under the terms of the OSA Open Access Publishing Agreement.
Goodman, J. W., "Some fundamental properties of speckle", Journal of the Optical Society of America, Nov. 1976, pp. 1145-1150, vol. 66, No. 11, Optical Society of America.
Gottschling, K. et al., "Molecular Insights into Carbon Dioxide Sorption in Hydrazone-Based Covalent Organic Frameworks with Tertiary Amine Moieties", Chemistry of Materials, Feb. 13, 2019, pp. 1946-1955, American Chemical Society.
Hashimoto, Y. et al., "Fabrication of an Anti-Reflective and Super-Hydrophobic Structure by Vacuum Ultraviolet Light-Assisted Bonding and Nanoscale Pattern Transfer", Micromachines, Apr. 15, 2018, pp. 1-11, www.mdpi.com/journal/micromachines.
Hollis, V. S. et al., "Non-invasive monitoring of brain tissue temperature by near-infrared spectroscopy", Proceedings of SPIE, Optical Tomography and Spectroscopy of Tissue IV, Jun. 29, 2001, pp. 470-481, vol. 4250, SPIE, https://www.spiedigitallibrary.org/conference-proceedings-of-spie/4250/1/Noninvasive-monitoring-of-brain-tissue-temperature-by-near-infrared-spectroscopy/10.1117/12.434506.short?SSO=1.
International Search Report and Written Opinion of the International Searching Authority, Mailed Mar. 11, 2021, Corresponding to PCT/IB2020/001037, 13 pages.
International Search Report and Written Opinion of the International Searching Authority, mailed Apr. 4, 2023, corresponding to PCT/EP2022/082341, 33 pages.
International Search Report and Written Opinion of the International Searching Authority, mailed Feb. 1, 2022, corresponding to PCT/IB2021/000649, 18 pages.
International Search Report and Written Opinion of the International Searching Authority, mailed Nov. 15, 2021, corresponding to PCT/IB2021/000517, 15 pages.
International Search Report and Written Opinion of the International Searching Authority, mailed Oct. 10, 2022, corresponding to PCT/IB2022/000373, 16 pages.
International Search Report and Written Opinion of the International Searching Authority, mailed Oct. 19, 2022, corresponding to PCT/EP2022/071467, 16 pages.
International Search Report and Written Opinion of the International Searching Authority, mailed Feb. 14, 2023, corresponding to PCT/EP2022/082162, 33 pages.
International Search Report and Written Opinion of the International Searching Authority, Mailed Dec. 11, 2024, Corresponding to PCT/IB2024/000388, 14 pages.
International Search Report and Written Opinion of the International Searching Authority, mailed Jan. 2, 2023, corresponding to PCT/EP2022/074876, 13 pages.
Invitation to Pay Additional Fees and Partial Search Report mailed Feb. 14, 2023 in related International Application No. PCT/EP2022/082341, 18 pages.
Izutsu, M. et al., "Integrated Optical SSB Modulator/Frequency Shifter", IEEE Journal of Quantum Electronics, Nov. 1981, pp. 2225-2227, vol. QE-17, No. 11, IEEE.
Kang, J. W. et al., "Direct observation of glucose fingerprint using in vivo Raman spectroscopy," Science Advances, Jan. 24, 2020, pp. 1-8, American Association for the Advancement of Science.
Karlsson, C. J. et al., "All-fiber multifunction continuous-wave coherent laser radar at 1.55 um for range, speed, vibration, and wind measurements", Applied Optics, Jul. 20, 2000, pp. 3716-3726, vol. 39, No. 21, Optical Society of America.
Lai, M. et al., "Perfusion Monitoring By Contactless Photoplethysmography Imaging", 2019 IEEE 16th International Symposium on Biomedical Imaging (ISBI 2019), Venice, Italy, Apr. 8-11, 2019, pp. 1778-1782, IEEE.
Lai, N. et al., "CO2 Capture With Absorbents of Tertiary Amine Functionalized Nano-SiO2", Frontiers in Chemistry, Feb. 28, 2020, pp. 1-9, vol. 8, Article 146, www.frontiersin.org.

(56) References Cited

OTHER PUBLICATIONS

Lapchuk, A. et al., "Investigation of speckle suppression beyond human eye sensitivity by using a passive multimode fiber and a multimode fiber bundle", Applied Optics, Feb. 21, 2020, pp. 6820-6834, vol. 28, No. 5, Optical Society of America.

Liu, X. et al., "Simultaneous measurements of tissue blood flow and oxygenation using a wearable fiber-free optical sensor", Journal of Biomedical Optics, Jan. 29, 2021, pp. 012705-1 through 012705-15, vol. 26, No. 1, SPIE.

Loi, R. et al., "Transfer Printing of AlGaInAs/InP Etched Facet Lasers to Si Substrates", IEEE Photonics Journal, Nov. 11, 2016, 11 pages, vol. 8, No. 6, IEEE.

Lu, H. et al., "Single-trial estimation of the cerebral metabolic rate of oxygen with imaging photoplethysmography and laser speckle contrast imaging", Optics Letters, Mar. 17, 2015, pp. 1193-1196, vol. 40, No. 7, Optical Society of America.

Mehta, D. S. et al., "Laser speckle reduction by multimode optical fiber bundle with combined temporal, spatial, and angular diversity", Applied Optics, Apr. 11, 2012, pp. 1894-1904, vol. 51, No. 12, Optical Society of America.

Merritt, S. et al., "Monitoring temperature non-invasively using broadband Diffuse Optical Spectroscopy", OSA/FIO, 2004, 1 page, Optical Society of America, https://opg.optica.org/abstract.cfm?URI=FiO-2004-FTuK4.

Mosso, E. et al., "Cluster speckle structures through multiple apertures forming a closed curve", Optics Communications, 2010, pp. 1285-1290, Elsevier B.V.

Noriki, A. et al., "45-degree curved micro-mirror for vertical optical I/O of silicon photonics chip", Optics Express, Jul. 1, 2019, pp. 19749-19757, vol. 27, No. 14, Optical Society of America, https://doi.org/10.1364/OE.27.019749.

Poulton, C. V. et al., "Frequency-modulated Continuous-wave LIDAR Module in Silicon Photonics", OFC, 2015, 4 pages, Optical Society of America.

Redding, B. et al., "Compact spectrometer based on a disordered photonic chip", Nature Photonics, Jul. 28, 2013, pp. 746-751, vol. 7, Macmillan Publishers Limited.

Redding, B. et al., "Evanescently coupled multimode spiral spectrometer", Optica, Aug. 25, 2016, pp. 956-962, vol. 3, No. 9, Optical Society of America.

Robinson, M. B., "Interferometric diffuse correlation spectroscopy improves measurements at long source-detector separation and low photon count rate", Journal of Biomedical Optics, Sep. 30, 2020, pp. 097004-1 through 097004-12, vol. 25, No. 9, SPIE.

Roelkens, G. et al., "Transfer printing for silicon photonics transceivers and interposers", 2018 IEEE Optical Interconnects Conference, Jun. 4, 2018, pp. 13-14, IEEE.

Ryckeboer, E., "Spectroscopic Detection of Glucose with a Silicon Photonic Integrated Circuit", Universiteit Gent, Jan. 1, 2014, 263 pages, ISBN 978-90-8578-688-7, http://www.photonics.intec.ugent.be/download/phd_206.pdf.

Schneider, S. et al., "Optical coherence tomography system massproducible on a silicon photonic chip", Optics Express, Jan. 20, 2016, pp. 1573-1586, vol. 24, No. 2, Optical Society of America.

ISdobnov, A. Y. et al. "Speckle dynamics under ergodicity breaking", Journal of Physics D: Applied Physics, Mar. 26, 2018, pp. 1-21, vol. 51, No. 15, IOP Publishing Ltd.

Shimotsu, S. et al., "Single Side-Band Modulation Performance of a LiNbO3 Integrated Modulator Consisting of Four-Phase Modulator Waveguides", IEEE Photonics Technology Letters, Apr. 2001, pp. 364-366, vol. 13, No. 4, IEEE.

Subramanian, A. Z. et al., "Silicon and silicon nitride photonic circuits for spectroscopic sensing on-a-chip [Invited]", Photon. Res., Aug. 28, 2015, pp. B47-B59, vol. 3, No. 5, Chinese Laser Press.

Timm, U. et al., "Non-Invasive Optical Real-time Measurement of Total Hemoglobin Content", Procedia Engineering, 2010, pp. 488-491, Elsevier Ltd.

Tran, T-T-K. et al., "Speckle reduction in laser projection displays through angle and wavelength diversity", Applied Optics, Feb. 16, 2016, pp. 1267-1274, vol. 55, No. 6, Optical Society of America.

Tuchin, V., "Chapter 8: Coherent Effects at the Interaction of Laser Radiation with Tissues and Cell Flows", Tissue Optics Light Scattering Methods and Instruments for Medical Diagnostics, 3rd Edition, 2015, pp. 359-417, SPIE.

U.S. Advisory Action for U.S. Appl. No. 17/822,419, dated May 2, 2024, 5 pages. (LR 225754).

U.S. Advisory Action for U.S. Appl. No. 17/822,419, dated Oct. 10, 2023, 6 pages. (LR 225754).

U.S. Notice of Allowance for U.S. Appl. No. 17/703,920, dated Jul. 31, 2024, 10 pages. (LR 220502).

U.S. Notice of Allowance from U.S. Appl. No. 17/757,130, dated Jan. 18, 2023, 10 pages.

U.S. Notice of Allowance from U.S. Appl. No. 17/822,419, dated Nov. 6, 2024, 10 pages.

U.S. Office Action for U.S. Appl. No. 17/703,920, dated Apr. 5, 2024, 11 pages. (LR 220502).

U.S. Office Action for U.S. Appl. No. 17/822,419, dated Feb. 20, 2024, 12 pages. (LR 225754).

U.S. Office Action for U.S. Appl. No. 17/822,419, dated Jun. 12, 2024, 12 pages. (LR 225754).

U.S. Office Action for U.S. Appl. No. 17/822,419, dated Nov. 3, 2023, 18 pages. (LR 225754).

U.S. Office Action from U.S. Appl. No. 17/711,974, dated Oct. 11, 2024, 18 pages.

U.S. Office Action from U.S. Appl. No. 17/822,419, dated Jul. 20, 2023, 21 pages. (LR 225754).

U.S. Office Action from U.S. Appl. No. 17/822,419, dated Mar. 10, 2023, 17 pages. (LR 225754).

U.S. Office Action from U.S. Appl. No. 17/934,502, dated Aug. 31, 2023, 6 pages.

U.S. Office Action from U.S. Appl. No. 17/934,502, dated Feb. 1, 2024, 6 pages.

U.S. Office Action from U.S. Appl. No. 17/934,502, dated Jun. 5, 2024, 7 pages.

U.S. Office Action from U.S. Appl. No. 18/778,893, dated Apr. 22, 2025, 9 pages.

Valley, G.C. et al., "Multimode waveguide speckle patterns for compressive sensing", Optics Letters, May 23, 2016, pp. 2529-2532, vol. 41, No. 11, Optical Society of America.

Van Gastel, M. et al., "Camera-based pulse-oximetry-validated risks and opportunities from theoretical analysis", Biomedical Optics Express, Dec. 5, 2017, pp. 102-119, vol. 9, No. 1, Optical Society of America.

Website: "0.07mm Dia., TO-46 Package, InGaAs Photodiode", 2022, printed Dec. 7, 2022, 1 page, Edmund Optics Inc., https://www.edmundoptics.com/p/ingaas-detector-70mum-dia-to-46/12571/.

Website: "FlowMet Peripheral Blood Flow Monitoring System", updated Oct. 2022, printed Dec. 7, 2022, 7 pages, https://www.medtronic.com/us-en/healthcare-professionals/products/cardiovascular/intraprocedural-monitoring/flowmet.html.

Website: "Optical Solutions", Molex, dated 2023, printed May 10, 2023, 13 pages, Molex, LLC, https://www.molex.com/en-us/products/optical-solutions.

Website: "Track Your SpO2 to Uncover Changes in Your Wellbeing", Fitbit News, dated Sep. 7, 2020, printed Apr. 17, 2023, 7 pages, Fitbit, Inc., https://blog.fitbit.com/track-your-spo2/).626.

Wenz, J. J., "Examining water in model membranes by near infrared spectroscopy and multivariate analysis", BBA—Biomembranes, Dec. 9, 2017, pp. 673-682, Elsevier B.V., https://www.sciencedirect.com/science/article/pii/S0005273617303905.

Xu, J. et al., "Interferometric speckle visibility spectroscopy (ISVS) for human cerebral blood flow monitoring", APL Photonics, Dec. 4, 2020, pp. 126102-1 through 126102-10, vol. 5. AIP Publishing.

Xu, M. et al., "Laser Speckle Reduction Using a Motionless Despeckle Element Based on Random Mie Scattering", Journal of Display Technology, Nov. 12, 2013, pp. 151-156, vol. 10, No. 2, IEEE.

Yamakoshi, Y. et al., "Side-scattered finger-photoplethysmography: experimental investigations toward practical noninvasive measure-

(56) References Cited

OTHER PUBLICATIONS ment of blood glucose", Journal of Biomedical Optics, Jun. 2017, pp. 067001-1 through 067001-11, vol. 22, No. 6, SPIE.

Yao, Z. et al., "Integrated Silicon Photonic Microresonators: Emerging Technologies", IEEE Journal of Selected Topics in Quantum Electronics, Jun. 11, 2018, 24 pages, vol. 24, No. 6, IEEE.

Zalevsky, Z. et al., "Novel Approaches for Near and Far Field Super Resolved Imaging", 22nd Congress of the International Commision for Optics: Light for the Development of the World, Proc. of SPIE, Sep. 15, 2011, pp. 80116M-1 through 80116M-11, vol. 8011, No. 1, SPIE.

Zhang, J. et al., "III-V-on-Si photonic integrated circuits realized using micro-transfer-printing", APL Photonics, Nov. 4, 2019, pp. 110803-1 through 110803-10.

Zijlstra, W. G. et al., "Absorption Spectra of Human Fetal and Adult Oxyhemoglobin, De-Oxyhemoglobin, Carboxyhemoglobin, and Methemoglobin", Clinical Chemistry, Sep. 1991, pp. 1633-1638, vol. 37, No. 9, https://academic.oup.com/clinchem/article-abstract/37/9/1633/5649610?redirectedFrom=fulltext.

Zilkie, A. J. et al., "Multi-Micron Silicon Photonics Platform for Highly Manufacturable and Versitile Photonic Integrated Circuits", IEEE Journal of Selected Topics in Quantum Electronics, Apr. 15, 2019, 13 pages, vol. 25, No. 5, IEEE.

Zilkie, A. J. et al., "Power-efficient III-V/Silicon external cavity DBR lasers", Optics Express, Sep. 27, 2012, pp. 23456-23462, vol. 20, No. 21, Optical Society of America.

\* cited by examiner

SYSTEM AND METHOD FOR MEASURING PULSE WAVE VELOCITY

CROSS-REFERENCE TO RELATED APPLICATION(S)

The present application claims priority to and the benefit of U.S. Provisional Application No. 63/726,217, filed Nov. 27, 2024, entitled "SYSTEM AND METHOD FOR MEASURING PULSE WAVE VELOCITY", the entire content of which is incorporated herein by reference.

FIELD

One or more aspects of embodiments according to the present disclosure relate to biomarker monitoring, and more particularly to a system and method for measuring pulse wave velocity.

BACKGROUND

Fluctuations in blood pressure during a cardiac cycle, such as the increase in pressure and flow rate associated with a systolic peak, may travel along arteries with a velocity known as the pulse wave velocity.

It is with respect to this general technical environment that aspects of the present disclosure are related.

SUMMARY

According to an embodiment of the present disclosure, there is provided a system, including: a pulse timing sensor, including: a first wearable speckleplethysmography sensor; and a second wearable speckleplethysmography sensor, the first wearable speckleplethysmography sensor being configured to measure a blood flow velocity at a first point, on a first artery, and the second wearable speckleplethysmography sensor being configured to measure a blood flow velocity at a second point on a second artery.

In some embodiments, the first wearable speckleplethysmography sensor includes two lasers.

In some embodiments, the first wearable speckleplethysmography sensor includes two image sensors.

In some embodiments, the system further includes a processing circuit, wherein: the first wearable speckleplethysmography sensor includes two lasers or two image sensors, and the processing circuit is configured to select, for use, a first combination, of a laser and an image sensor, of the first wearable speckleplethysmography sensor, based on a signal quality of the first combination.

In some embodiments: the second wearable speckleplethysmography sensor includes two lasers or two image sensors, and the processing circuit is configured to select, for use, a second combination, of a laser of the second wearable speckleplethysmography sensor and an image sensor of the second wearable speckleplethysmography sensor, based on a signal quality of the second combination.

In some embodiments: the first artery is the same artery as the second artery; and the processing circuit is further configured to calculate a path length along the artery based on: a location of the laser of the first combination and a location of the image sensor of the first combination and a location of the laser of the second combination and a location of the image sensor of the second combination.

In some embodiments, The system of claim 1, further including a housing containing the pulse timing sensor, the housing being sized and dimensioned to fit on a wrist of a subject, over a radial artery of the subject.

In some embodiments, a first image sensor of the first wearable speckleplethysmography sensor is a rolling-shutter image sensor.

In some embodiments, a speckle size at the first image sensor is smaller than a size of a pixel of the first image sensor.

In some embodiments, a second image sensor, of the second wearable speckleplethysmography sensor, is a rolling-shutter image sensor.

In some embodiments, a speckle size at the second image sensor is smaller than a size of a pixel of the second image sensor.

In some embodiments, the system is configured to estimate a pulse wave velocity based on a first plurality of data points, from the first wearable speckleplethysmography sensor, and a second plurality of data points, from the second wearable speckleplethysmography sensor.

In some embodiments, a data point of the first plurality of data points is based on a standard deviation of a plurality of pixel values of pixels of a row of the first image sensor.

In some embodiments, the system is configured to estimate the pulse wave velocity based on a cross-correlation of the first plurality of data points and the second plurality of data points.

In some embodiments, the cross-correlation is an array cross-correlation.

In some embodiments, a first image sensor of the first wearable speckleplethysmography sensor is configured to operate at a frame rate between 50 Hz and 1 kHz.

In some embodiments, a first image sensor of the first wearable speckleplethysmography sensor is a rolling shutter image sensor configured to operate with a row lag time of less than 50 microseconds.

In some embodiments, a first image sensor of the first wearable speckleplethysmography sensor is a zero chief ray angle image sensor.

In some embodiments, a distance between the first point and the second point is greater than 5 mm and less than 40 mm.

In some embodiments, the first artery is a different artery from the second artery.

BRIEF DESCRIPTION OF THE DRAWINGS

These and other features and advantages of the present disclosure will be appreciated and understood with reference to the specification, claims, and appended drawings wherein:

DETAILED DESCRIPTION

Figures 1A, 1B:
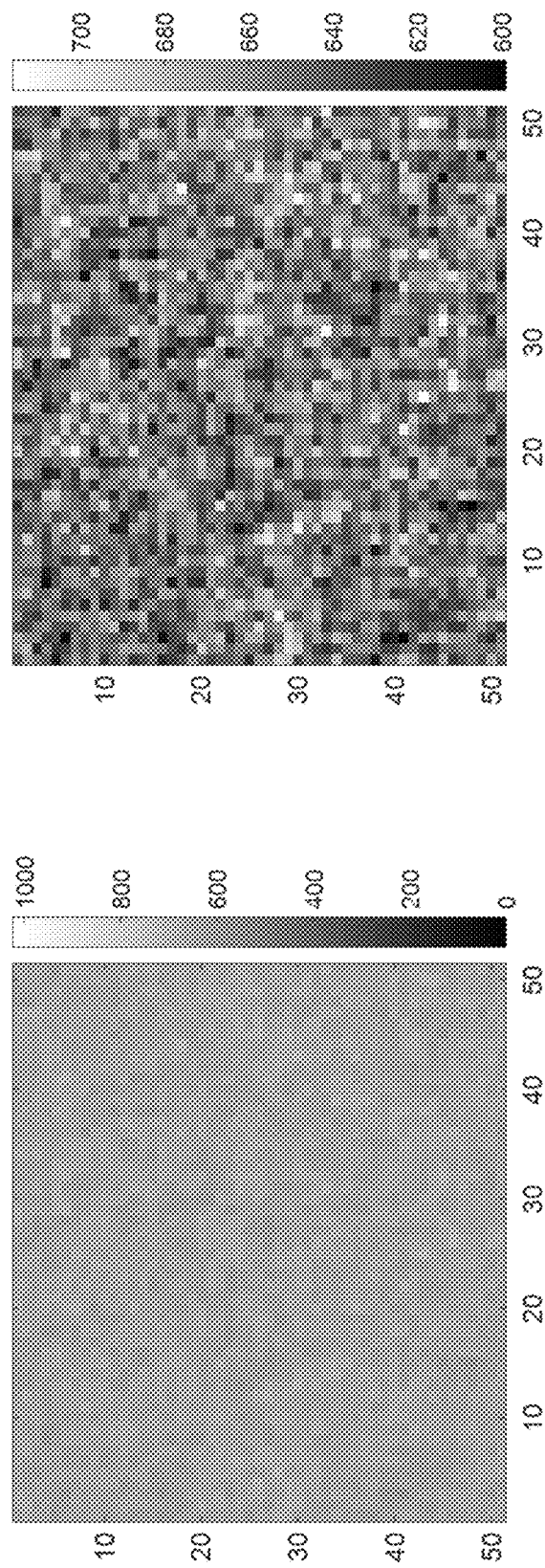
FIG. 1A is a sub-image of a speckle image, according to an embodiment of the present disclosure.
FIG. 1B is a sub-image of a speckle image, according to an embodiment of the present disclosure.

The detailed description set forth below in connection with the appended drawings is intended as a description of exemplary embodiments of a system and method for measuring pulse wave velocity provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Pulse Wave Velocity (PWV) is a measure of the speed at which a blood pressure pulse travels through an artery or group of arteries. It is related to arterial stiffness and is an important biomarker for cardiovascular health. Pulse wave velocity increases with age and has been used to indicate vascular age and as a predictor for cardiovascular disease. It may also be used in the calculation of blood pressure in a cuffless blood pressure monitor.

Pulse wave velocity may be calculated by placing a first pulse sensor and a second pulse sensor some distance apart and measuring the time difference between the pulse arrival at the first pulse sensor and the pulse arrival at the second pulse sensor. The pulse may be sensed by various kinds of sensors, including pressure transducers such as those utilized in oscillometric blood pressure cuffs, various microelectromechanical systems (MEMS)-based sensors, or piezo-electric sensors. These types of sensors measure a physical distension due to the passing pulse wave. Sensors based on differences in the transmission of sound (ultrasound Doppler) or light (laser Doppler) may also be used. Photoplethysmography (PPG), a light-based technique, which measures the absorption of light due to the increased blood volume that comes with a pulse wave, may also be used.

The sensors used in pulse wave velocity determinations may be placed far apart on the body, such as at the carotid and femoral arteries, the brachial and ankle arteries, the finger and toe, or the radial artery and finger. The large sensor separation may be advantageous due to the high speeds of the pulse wave, which ranges from 5 m/s to 15 m/s. For example, the pulse transit time between the carotid and femoral artery is on the order of 45 ms whereas the pulse transit time between the radial artery and fingertip, approximately ⅓ the distance, is 15 ms. As such, the sensors may be at different points on the same artery, or on different arteries. For a first sensor and a second sensor that are on different arteries, such as on the brachial and ankle arteries, the pulse arrival time difference may be a measure of the difference between (i) the pulse transit time from a common point (e.g., in the aorta) to the first sensor and (ii) the pulse transit time from the common point to the second sensor.

For sensors placed close together, e.g., around 3 cm apart, a high sample rate, e.g., 2000 samples per second, may be used to resolve the pulses in time well enough to calculate the difference between the pulse arrival times.

Distension-based sensors may require a palpable pulse, which may limit the application. As such, it may be advantageous to use an optical approach that can sense an arterial pulse wave without needing a mechanical force to be transmitted to the skin surface.

One optical approach is photoplethysmography (PPG), which uses a light source, such as an (incoherent) light-emitting diode (LED), placed some distance away from a photodiode that monitors the change in light intensity over time. To use the PPG signal to measure transit time, the signal to noise ratio must be sufficiently high to extract characteristic pulse features in the waveform; this may be challenging to achieve. The PPG signal near an artery may be distorted or inverted due to the intensity being affected by both optical absorption and optical scattering; this may further complicate the use of a method relying on PPG.

Another optical technique, speckleplethysmography (SPG), may be employed to measure blood flow based on laser speckle imaging. For example, the tissue of a subject, including the blood flowing in an artery of the subject, may be illuminated with temporally coherent light (e.g., light from a laser) and the resulting scattered light may be detected using an image sensor. Each image captured by the image sensor may be processed to obtain a measured speckle contrast. For example, a filtered image may be generated by processing the captured image with a 7×7 moving average filter, which may suppress uncorrelated noise such as shot noise and read noise more than the speckle signal. The measured speckle contrast may be calculated as the variance of the filtered image, which may be lower the greater the blood flow velocity, because at higher blood flow velocities, the speckle pattern may change more during the exposure time than at lower blood flow velocities. As such, the measured speckle contrast may be used to measure (e.g., to estimate) the blood flow velocity.

Small, high frame rate image sensors (e.g., CMOS image sensor, such as ones used in computer mice) may be inexpensive and suitable for use in a small (e.g., wearable) pulse wave velocity sensor. Such image sensors may be capable of sample (frame) rates of a few thousand per second. Such high frame rates may, however, correspond to sufficiently short exposure times (which may be less than the time between frames less the read-out time) that too few photons are collected to measure speckle contrast with an acceptable signal-to-noise ratio. An array of Single-Photon Avalanche Diodes (SPADs) may exhibit performance superior to that of a CMOS image sensor, but the cost and power consumption of such an array may not be acceptable in a wearable pulse wave velocity sensor.

An image sensor designed for imaging applications may include a micro-lens array that includes one micro-lens for each pixel in the image sensor. Each micro-lens may concentrate the received light on the light-sensitive portion of the corresponding pixel (in some devices part of the area of the pixels is allocated to a control and readout circuit and is not light-sensitive). Such a microlens may be offset from the center of the light-sensitive portion of the corresponding pixel if the chief ray angle for the pixel, in an optical system for which the image sensor is intended, is not zero, i.e., if the chief ray corresponding to the pixel is not perpendicular to the plane of the image sensor. This may be because the pixel is not near the center of the array (e.g., because the pixel is near the edge of the array). The offsetting of microlenses from the light-sensitive portion of the corresponding pixels may result in vignetting (lower exposure at and near the edges of the image sensor) in applications (such as the optodes described herein) in which the illumination is generally diffuse Lambertian illumination, which is approximately isotropic over a large solid angle, because in such a configuration a greater proportion of the received light may miss the light-sensitive portion of the corresponding pixel if the microlens is offset from the light-sensitive portion of the corresponding pixel. As such, in some embodiments, an image sensor that does not include a micro-lens array, or an image sensor that includes a micro-lens array and that is a zero chief ray angle (CRA) image sensor (e.g., an image sensor in which each micro-lens is aligned with (not offset from) the light-sensitive portion of the corresponding pixel) may be used. As used herein, a zero chief ray angle sensor is a sensor (i) that does not include a microlens array or (ii) that includes a micro-lens array in which each chief ray angle is small (e.g., less than 5 degrees) (where the chief ray is a ray that passes through the center of the aperture and ends at the center of the light-sensitive area of the pixel, and the chief ray angle is the angle between the chief ray and a line perpendicular to the plane of the detector).

As such, some embodiments include a low-cost, compact, optical pulse timing sensor that directly measures pulse transit time and calculates pulse wave velocity based on the distance between speckleplethysmography sensors each of which may be referred to as an "optode". Each optode includes a laser and an image sensor, separated along a direction perpendicular to the long axis of the artery being sampled. Each optode may be wearable, e.g., it may be contained in a housing sufficiently small (and light, with its contents) to be secured (e.g., by a strap or by an adhesive patch) to the body (e.g., to the arm (e.g., to the wrist or to the finger), to the leg (e.g., to the ankle or to the toe), to the neck, or to the torso) of a subject. In some embodiments multiple wearable optodes (configured to operate as the speckleplethysmography sensors of a pulse wave velocity sensor) are contained in a shared housing; in such an embodiment the optodes may be spaced less than 100 mm apart, (e.g., 25 mm apart) parallel to the long axis of a single artery. The coherent properties of the laser, the wavelength, the optical geometry including aperture size, the separation between the aperture and the image sensor, and the pixel size of the image sensor may be adjusted so that the generated speckles are much smaller than the pixel size, and therefore unresolved (instead of being larger than the pixel size, as in the speckle imaging method described above). In this way, the speckle statistics calculated for one row of the image sensor are independent from those calculated for an adjacent row. FIGS. 1A and 1B show an example of a sub-image (e.g., a sub-image having dimensions of approximately 50 pixel×50 pixels) of an image obtained under such circumstances. The color bar of FIG. 1B has been adjusted so that the pixel to pixel variation is more readily apparent. It may be seen that variation between pixels is present (and this may be in part due to speckle) but resolved speckles are not clearly present.

Further, as discussed in further detail below, the image sensor may be of the rolling shutter type in which each row is read out successively, with a lag time between readout that is fixed and known and on the order of microseconds. The second image sensor may be similarly configured and triggered with a capture time offset (as discussed in further detail below) that is fixed and known. In this way, the row lag time can be used as the time basis for conducting a cross correlation of the row-by-row speckle statistics for each image sensor. The peak correlation lag time can be adjusted for the fixed known capture time offset and, after such an adjustment, may be a measurement of the pulse transit time. Pulse wave velocity can then be calculated from this transit time and the known distance between optodes.

Figure 2:
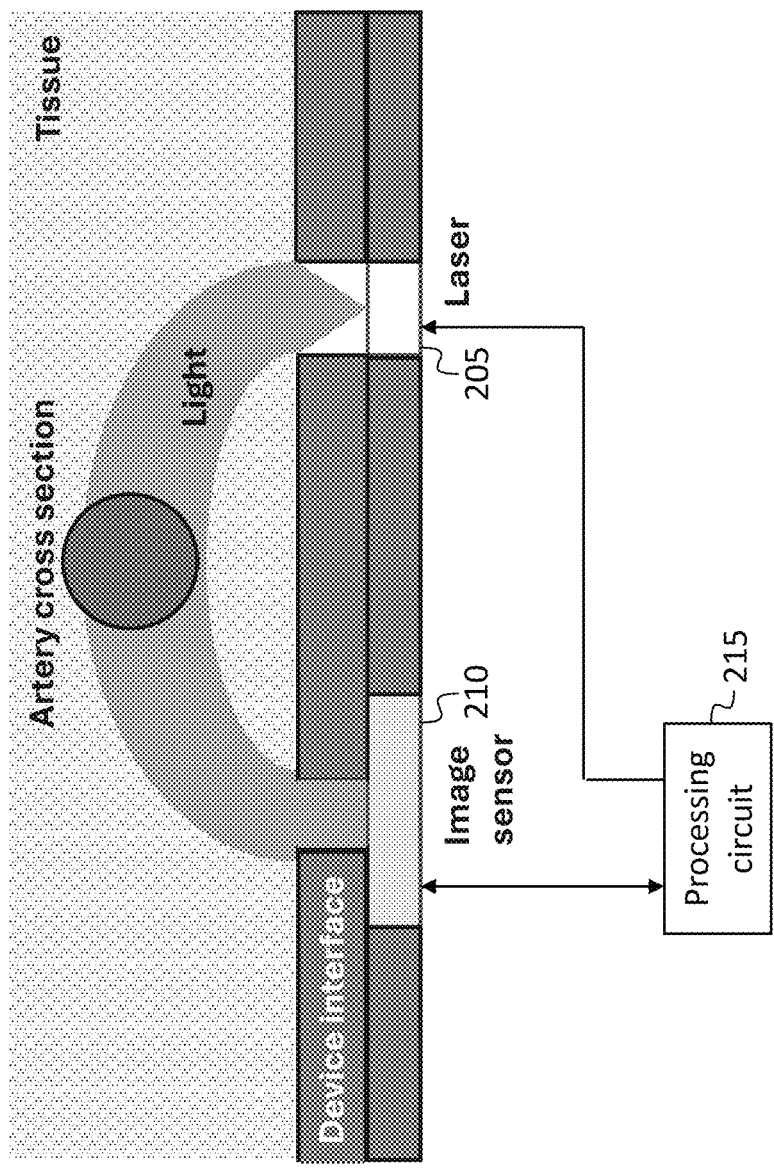
FIG. 2 is a schematic drawing of a speckleplethysmography sensor and tissue of a subject, according to an embodiment of the present disclosure.
Figure 3:
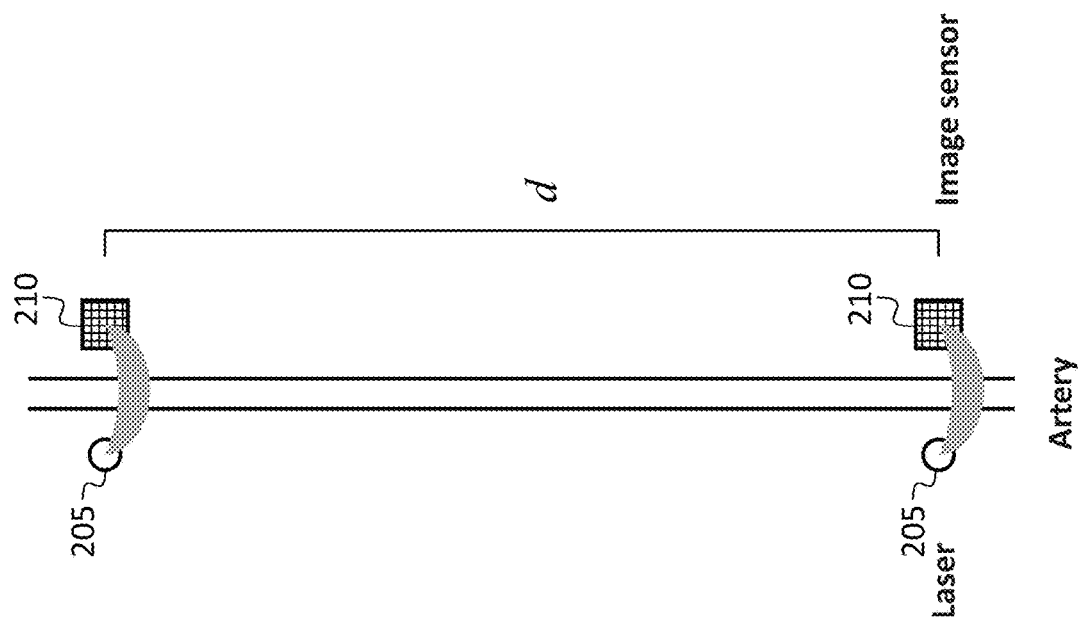
FIG. 3 is a schematic drawing of two speckleplethysmography sensors on an artery of a subject, according to an embodiment of the present disclosure.
Figure 4:
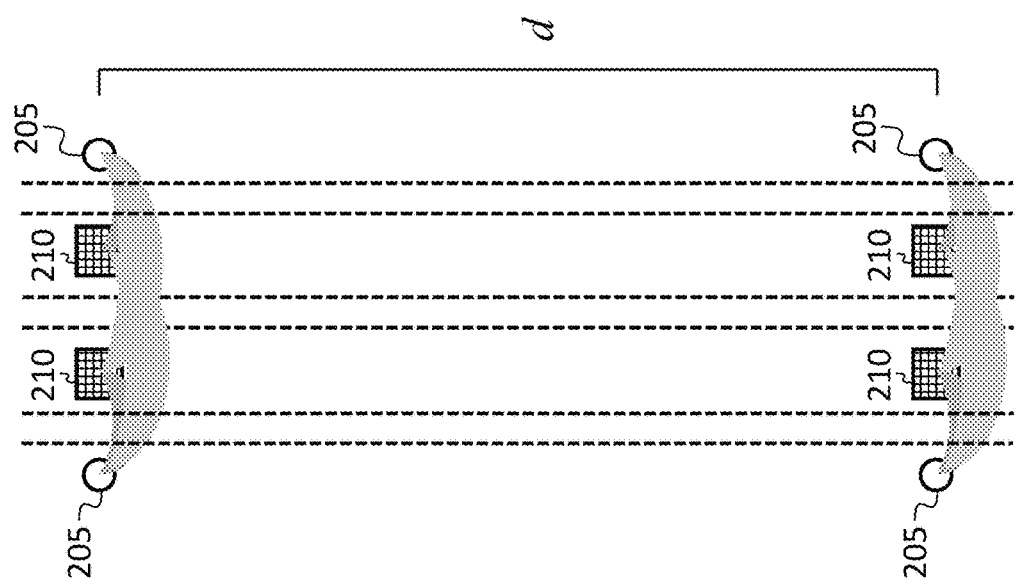
FIG. 4 is a schematic drawing of two speckleplethysmography sensors on an artery of a subject, for several possible positions of the artery relative to the sensors, according to an embodiment of the present disclosure.

In some embodiments, a pulse wave velocity sensor includes two optodes. Each optode may include a laser 205 and an image sensor 210, placed apart on the skin over an artery, and connected to a processing circuit 215 (e.g., a microcontroller) as shown in FIG. 2. The two optodes may be separated along the length of the artery, with a separation distance d of less than 100 mm, as shown in FIG. 3. The separation distance may be about 25 mm, or 1 inch; at this optode separation, the pulse wave velocity sensor may fit into a wearable device that may be worn, e.g., (i) on the wrist of a subject, for radial artery sensing, or (ii) as a necklace or as patches for carotid artery or ankle measurements, respectively. In some embodiments, each optode may include more than one laser 205 or more than one image sensor 210, as illustrated in FIG. 4 (in which each optode includes two lasers 205 and two image sensors 210). In an embodiment with a plurality of lasers 205 in an optode, the lasers 205 may be phase locked together (e.g., by optical coupling between the lasers 205) or turned on one at a time. Embodiments like that of FIG. 4 may make it possible to adapt to various positions of the artery (shown, in FIG. 4, in each of three different positions) depending on which combination of laser 205 and image sensor 210 exhibits the best signal quality. For example, the processing circuit 215 may select such a combination for use, by turning on the laser 205 of such a combination, or by using the image sensor data from such a combination. In some embodiments, the system may instruct the user to adjust the position of the sensor (e.g., on the wrist) in a direction determined based on which combination of laser 205 and image sensor 210 exhibits the best signal quality.

The physical separation between the optodes may be exactly known, to avoid an error in the distance which otherwise may directly result in error in the calculated (e.g., estimated) pulse wave velocity. The laser 205 and the image sensor 210 may be positioned perpendicular to the artery being sampled rather than parallel to the artery to maximize the precision of the distance measurement. If parallel, there may be more uncertainty regarding exactly which parts of the artery contributed to the signal and therefore what the actual distance measurement should be.

Figure 5:
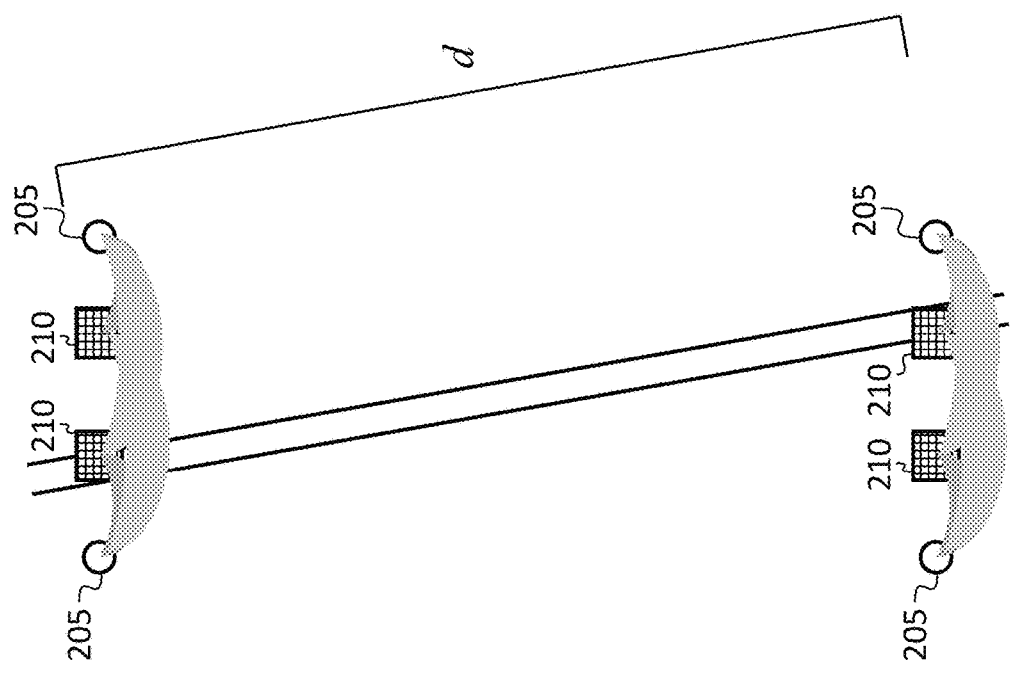
FIG. 5 is a schematic drawing of two speckleplethysmography sensors on an artery of a subject, according to an embodiment of the present disclosure.

For example, if the artery is oblique to a straight line between the center of the first optode and the center of the second optode as shown in FIG. 5, in which a left-most laser-image sensor pair and a right-most laser-image sensor pair give the best signal, then these laser-image sensor pairs may be used for calculating the pulse transit time (PTT), and a path length d along the artery for the pulse wave may be calculated in a manner that takes this angle into account (e.g., $d=d0/\cos\theta$, where d0 is the separation between the optodes, and $\theta$ is the angle between the artery and the straight line between the center of the first optode and the center of the second optode).

To improve precision in the optode distance measurement, the apertures over the laser 205 and image sensor 210 may be relatively small while still fulfilling the required signal-to-noise ratio and, in some embodiments, a speckle size that is smaller than the pixel size. As an example calculation, if the optodes, and therefore the image sensors 210, are placed 25 mm apart and the pulse wave velocity is 10 m/s, then the pulse transit time is 2.5 ms. If a pulse transit time of 2.5 ms is measured, but the optodes were actually 24.5 mm apart, the calculated pulse wave velocity would instead be 24.5 mm/2.5 ms=9.8 m/s. Thus, measures may be taken for the distance between the optodes to be accurately known (e.g., by measurement during fabrication, or by design). In some embodiments, for example, a device is fabricated by creating an over-molded aperture that is located (e.g., by mechanical registration features) to the image sensor 210.

As mentioned above, in some embodiments, the coherent properties of a laser 205 are used to generate speckle, but the system does not employ laser speckle imaging in the sense of using a speckle size that is larger than the pixel size. For example, in laser speckle imaging, to fulfill the Nyquist criterion for image resolution, the speckle size is larger than twice the pixel size. In such a system, as discussed above, when performing speckleplethysmography, a moving window with a size of 7×7 pixels may be scanned across the speckle resolved image and the window's standard deviation and mean intensity may be calculated. To avoid blurring of the speckle image, a global shutter acquisition may be used. As discussed above, some embodiments instead use a configuration such that the speckle size is much less than the pixel size. For example, the relationship between aperture diameter (D) and the distance (Z) between the tissue or surface and the image sensor 210 may be governed by $S=\lambda Z/D$ where S is the speckle diameter and $\lambda$ is the wavelength of light. Some embodiments use a comparatively large aperture (having a diameter or other transverse dimension (e.g., a diagonal dimension, for a square aperture) greater than 0.5 mm or greater than 1 mm) and a small (less than 2 mm) z distance for the image sensor 210. The laser 205, while coherent, is not required to be single mode. In this manner, speckle "noise" exists on an image sensor 210 (e.g., the presence of sub-pixel-sized speckle contributes to the variance (or standard deviation) in pixel values) while not resulting in resolvable speckle grains.

Figure 6A:
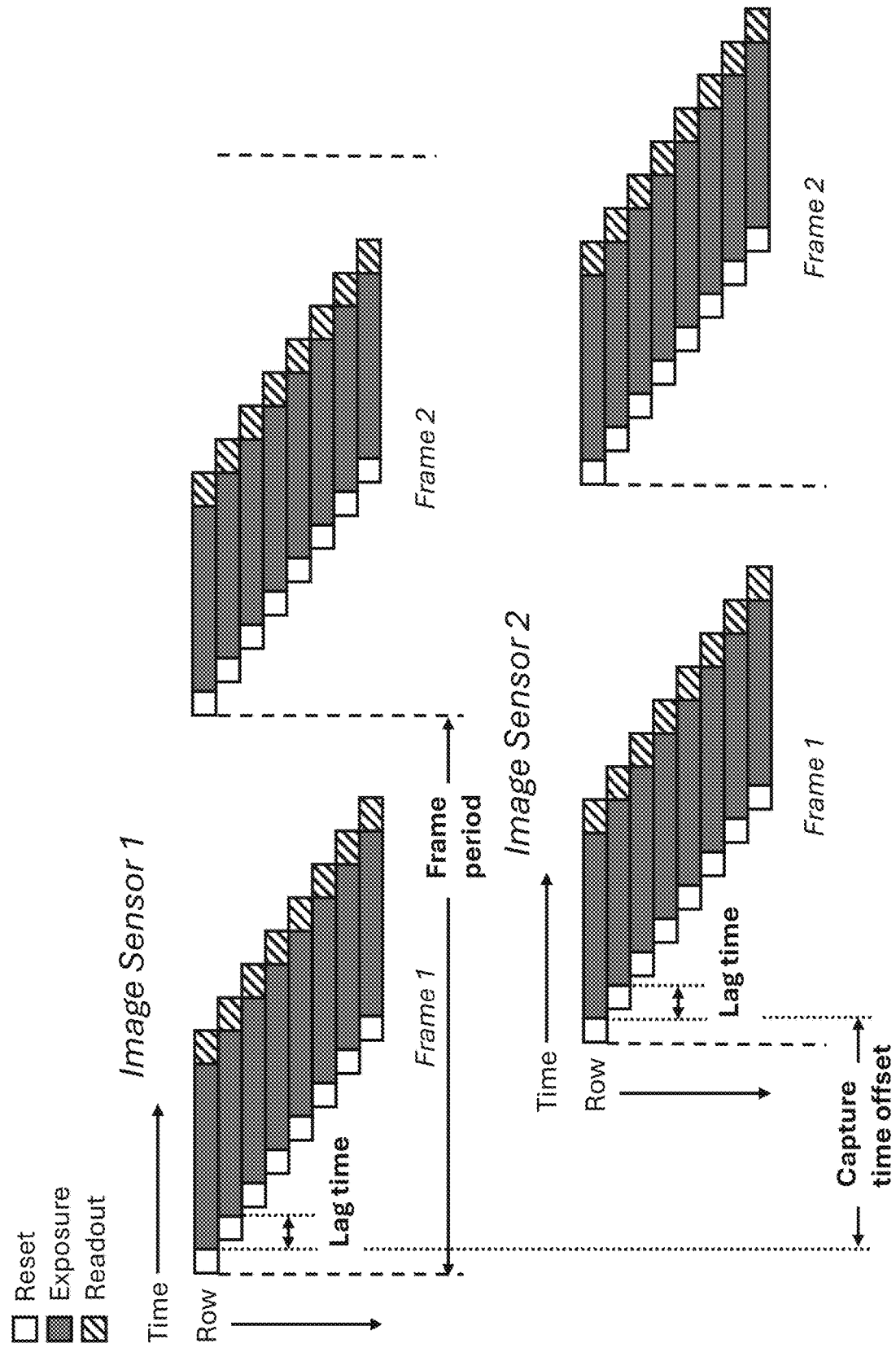
FIG. 6A is a timing diagram showing the operation of two image sensors, according to an embodiment of the present disclosure.

As mentioned above, a rolling shutter may be used for acquisition rather than a global shutter as there is no blurring of the speckle image with speckle smaller than the pixel size. In a rolling shutter acquisition, each row is read out successively as soon as exposure is complete. The operation of the two image sensors 210 in a pulse wave velocity sensor having two optodes with one image sensor 210 each is illustrated, for one embodiment, in FIG. 6A. The delay between the acquisition of one row and the next row may be referred to as the "lag time" or the "row lag time", where each acquisition includes a reset, an exposure, and a readout, as illustrated. The interval between consecutive frames (the reciprocal of the frame rate) may be referred to as the "frame period". The delay between the start of a frame in the first image sensor 210 and the start of the corresponding frame in the second image sensor 210 may be referred to as the "capture time offset".

Figure 6B:
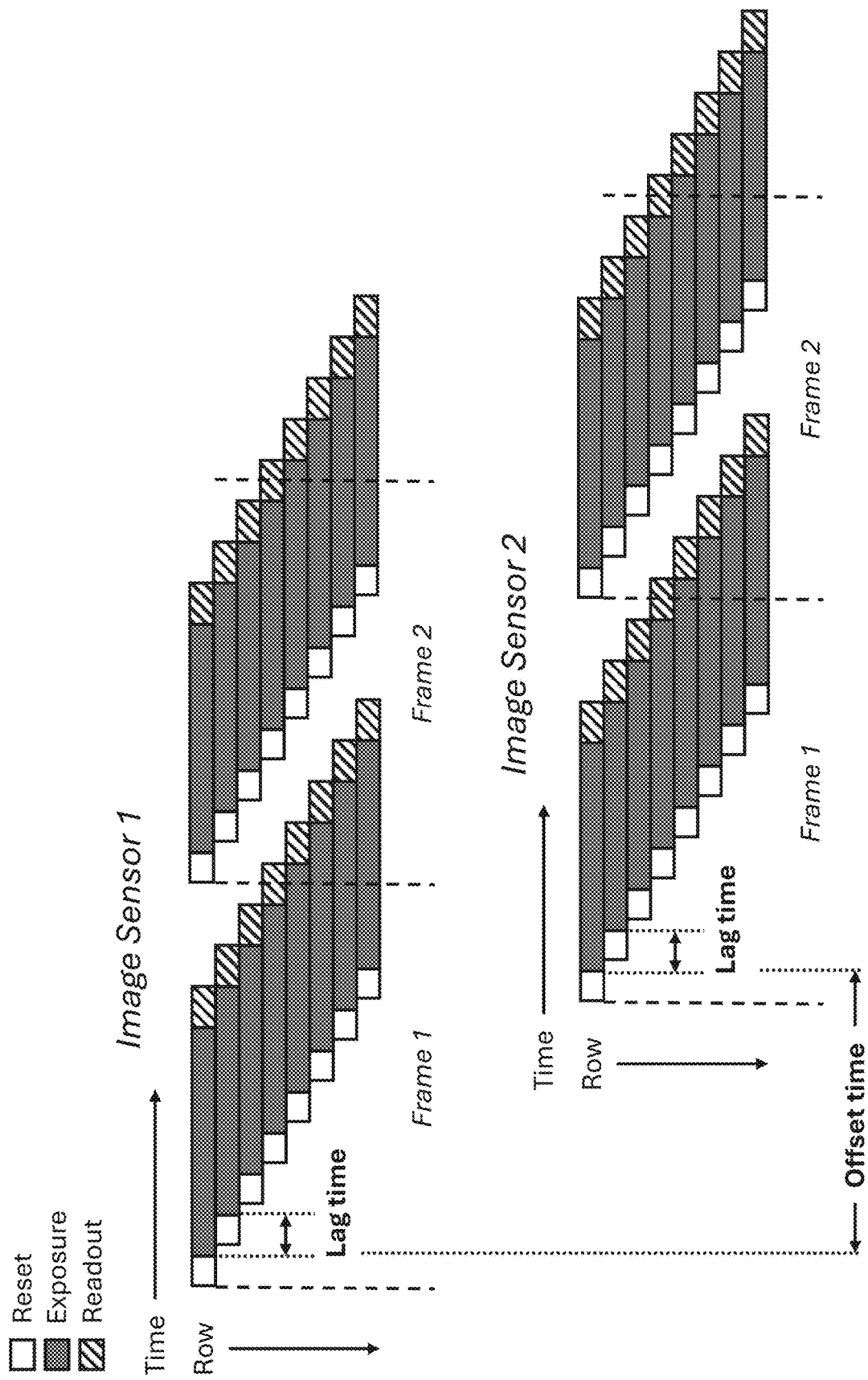
FIG. 6B is a timing diagram showing the operation of two image sensors, according to an embodiment of the present disclosure.

In a rolling shutter sensor, it may be possible for the first row to begin a new exposure before the last row is read out. This is illustrated in FIG. 6B. For high frame rates or long exposures, the readout of the last row is not complete before the first row begins a new exposure.

The time shift between successive rows of a rolling shutter sensor is used as part of the measurement method, in some embodiments. In such an embodiment, the standard deviation and mean intensity statistics may be calculated one row at a time for the rows of a rolling shutter image sensor (where a "row" is a set of pixels along the fast axis of the image sensor). Thus, a data point may be calculated for each row, each data point being the ratio of the standard deviation (of the pixel values of the row) to the mean (of the pixel values of the row). In some embodiments, each such data point may be calculated for a set of two or more rows (to improve the signal to noise ratio of the data points), e.g., by (i) calculating a preliminary data point for each row of the set of rows and calculating the average of the preliminary data points, or by (ii) calculating the ratio of the standard deviation (of all of the pixels in the set of rows) to the mean (of the pixel values in the set of rows). The sets of rows may overlap (e.g., each set may be defined as the rows in a moving window) or they may be disjoint. The difference in read-out time between successive rows may be used as a time basis. For example, for an image sensor 210 with 512 pixels in each row, the read-out time may be on the order of 2.5 microseconds per row, which as a time resolution corresponds to 400,000 samples per second. This fast effective sampling rate allows for the distance between the optodes to be smaller than would be possible in a pulse wave velocity sensor with a lower sample rate.

Furthermore, the time lag between rows (which may also be referred to as the "lag time" or the "row lag time") may be independent of the exposure time. Thus, an exposure time sufficient to obtain adequate signal to noise ratio may be utilized. Exposure times longer than the row readout time (e.g., longer than the row lag time) may reduce the independence of the row-to-row measurements, but this trade-off may be optimized for the application. Therefore, rather than sample rate being dictated by frame rate as in global shutter image sensors, the sample rate is dictated by the lag time between successive rows in the rolling shutter image sensor.

The frame rate may be selected to be sufficiently low to make it possible to perform row processing in real time using a relatively low-power processor, while fast enough to provide enough data points to resolve the rise and fall of the systolic peak in the speckleplethysmography blood flow waveform. In some embodiments, the frame rate is at least 50 Hz, or at least 100 Hz or more. In some embodiments the frame rate is between 50 Hz and 1 kHz. A frame rate exceeding 1 kHz may increase the cost and power consumption of the pulse wave velocity sensor, and may reduce exposure time and compromise the performance of the sensor. In some embodiments, the pixel values read out from each row are buffered (as illustrated in FIG. 7), making it unnecessary to perform analysis (e.g., the calculation of the per-row mean and standard deviation, and per-pulse cross-correlation) in real time.

A time delay error in cross-correlation can occur due to the discrete nature of sampled data. Various interpolation methods may be employed to find the true peak of the cross-correlation, though most curve fitting methods introduce bias. A higher sampling rate reduces the time delay error when time delay error due to sampling is larger than error due to poor SNR.

It may be advantageous to measure (e.g., estimate) the pulse wave velocity with an accuracy of 1%, e.g., with an accuracy of 0.1 m/s for a pulse wave velocity of 10 m/s. A 0.1 m/s change in a pulse wave velocity of 10 m/s with a distance between sensors of 25 mm corresponds to a time accuracy of 25 microseconds. It may not be feasible to fit the shape of the peak and calculate onset time differences to an accuracy of 25 microseconds with sample rates much below 1,000 samples/second. While this is a challenging specification to meet for a global shutter camera, the row-to-row time offset for a 512 pixel row is on the order of 2.5 microseconds. Thus, if the row-to-row time offset is used as the time base for a cross-correlation between the two image sensors 210, then the required 25 microsecond accuracy may be feasible.

Figure 7:
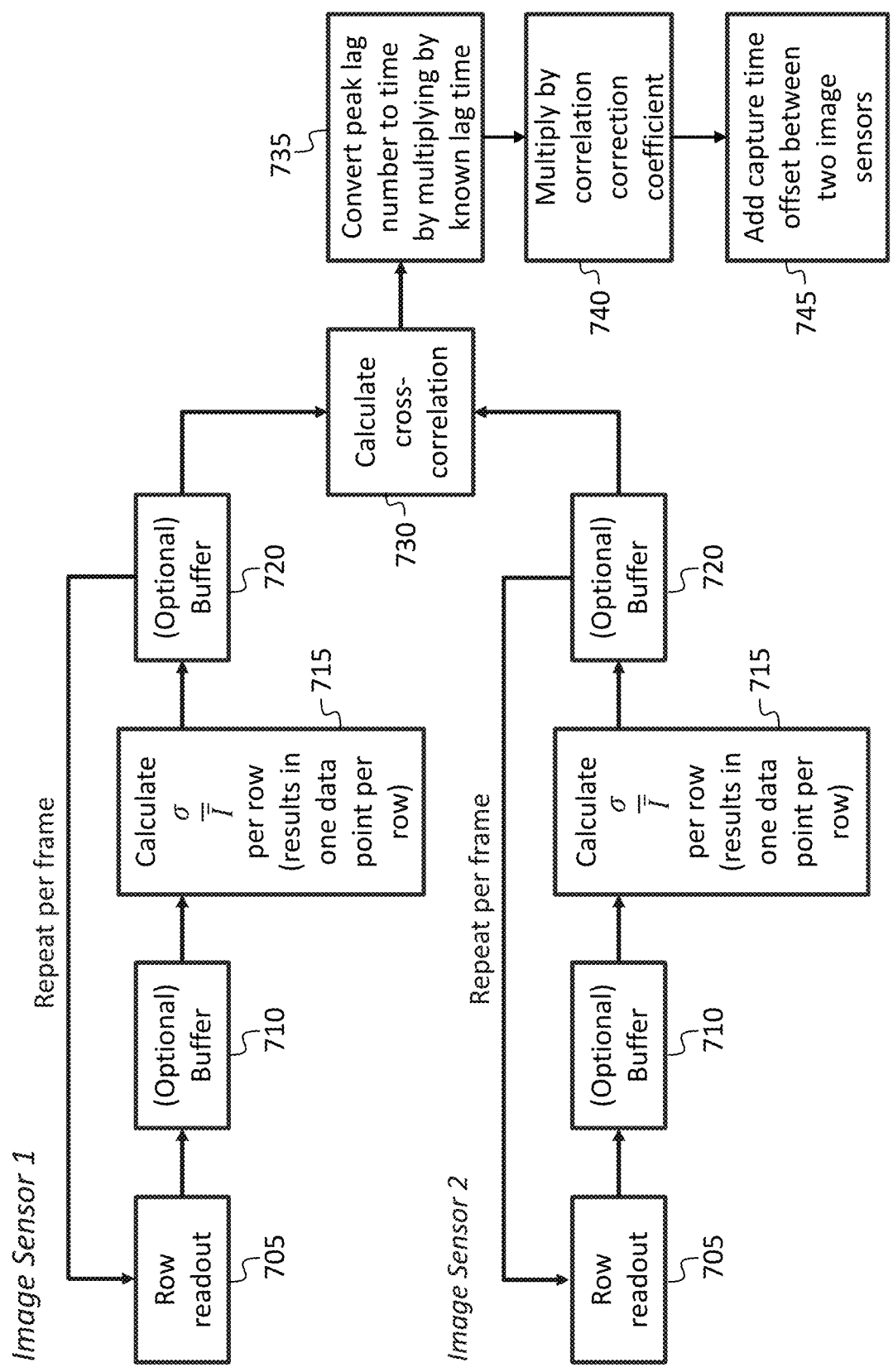
FIG. 7 is a flow chart or block diagram of a method for reading data from a rolling shutter image sensor and processing the data to estimate the pulse wave transit time, according to an embodiment of the present disclosure.

FIG. 7 is a flow chart or block diagram of a method for reading data from a rolling shutter image sensor and processing the data to estimate the pulse wave transit time, in some embodiments. In each of the first sensor and the second sensor, row readout is performed at 705, the data is optionally buffered at 710, the normalized standard deviation (the standard deviation $\sigma$ of the pixel values in a row divided by the average intensity $\bar{I}$ (the average pixel value) for the row) is calculated for each row at 715, and the resulting data is again optionally buffered at 720. The cross-correlation (e.g., the array cross-correlation) may then be calculated at 730, multiplied by (i) the lag time and (ii) the correlation coefficient correction (at 735 and 740, in the order illustrated, or, equivalently, in the reverse order) and adjusted by the addition of the capture time offset, to arrive at the estimated pulse transit time between the optodes.

The time gap (or "dead time") between successive frames may be removed in the cross correlation and a corresponding correction factor applied to the results of the peak lag time (the lag time at which the peak in the cross correlation occurs). This correlation correction factor is equivalent to the ratio of the frame period to the total row data time; e.g., the ratio of the number of samples at the row time spacing that would theoretically fit into the frame period to the number of rows used in the analysis. The time difference between the first sensor acquiring a frame and the second sensor acquiring a frame is also not problematic as long as this capture time offset is known. The capture time offset may be less than 100 ms so that the sensors are cross-correlated within the same pulse and preferentially within the same upstroke or downstroke. Therefore, the capture time offset may be less than 20 ms, e.g., less than 5 ms. The capture time offset may be added to the corrected, cross-correlated peak lag time to obtain the true pulse transit time.

A digital circuit for supplying a respective capture trigger to each of the image sensors 210 may send a capture trigger to the first image sensor periodically (at the frame rate) and it may send a capture trigger to the second image sensor with a delay of a certain number of clock cycles, which may be configurable (e.g., by a processing circuit 215 of the pulse wave velocity sensor).

Filtering may be employed to suppress, correct for, or eliminate data containing motion artifacts, anomalies due to laser mode hopping, or other non-physiological changes to the signal.

In some embodiments, a bandpass filter for pulsatile frequencies is applied to the signals prior to cross-correlating to improve the signal to noise ratio. The filter may be designed to avoid excessive effect on the timing information.

In some embodiments, data is discarded away from the position of the systolic peak, or such data is weighted less heavily in the calculation of the cross-correlation, because such data may be noisier than data at or near the systolic peak.

Performing a cross correlation over each of a plurality of systolic peaks may improve the measurement of the pulse transit time, although this time is known to vary slightly between pulses. Calculating per pulse and then averaging or building up data for the cross correlation at once may both be viable techniques.

Figure 8:
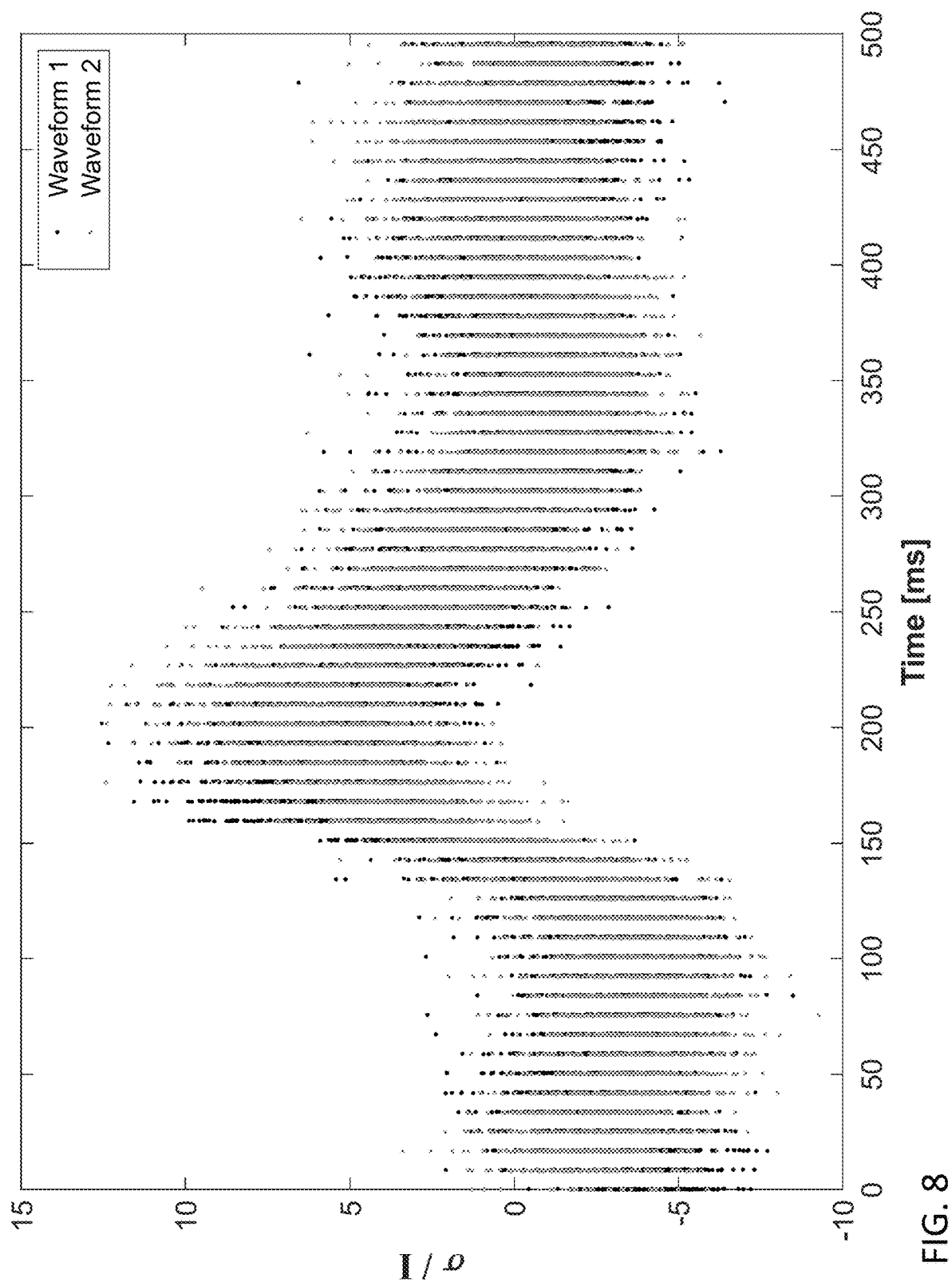
FIG. 8 is a graph of an example of results, according to an embodiment of the present disclosure.

The graph of FIG. 8 displays an example of results (each dot representing a $\sigma/\bar{I}$ value for one row of one image sensor 210, for one frame of a sequence of frames) following the flow chart of FIG. 7, prior to calculation of cross correlation, for a single heart beat (pulse). Waveform 1 is from image sensor 1 and waveform 2 is from image sensor 2. The dots corresponding to values of $\sigma/\bar{I}$ are spaced 2.5 microseconds apart and the large gaps (or "dead times") are due to the 8.3 ms frame period (corresponding to a frame rate of 120 Hz). In the example of FIG. 7, each image sensor 210 has 200 rows; as such, the total time used to read out all of the rows in either image sensor 210 is 2.5 microseconds times 200, i.e., 0.5 ms, which, as FIG. 7 shows, is significantly less than the 8.3 ms frame period. In the example of FIG. 7, the exposure time is 0.8 ms (also significantly shorter than the frame period).

As mentioned above, the dead time between frames may be non-problematic as long as the exposure time and frame rate settings are identical between the two image sensors 210. To calculate cross-correlation the row lag time may be used as the unit of time. The frame rate may be high enough to obtain a sufficient number of datapoints during the rise and fall of the systolic pulse that a narrow enough cross-correlation peak may result. The frame rate may be at least 50 Hz, e.g., more than 100 Hz. Frames rates significantly lower than 1 kHz may be more commonly available than higher frame rates and with power consumption that may work in a wearable device.

Figure 9:
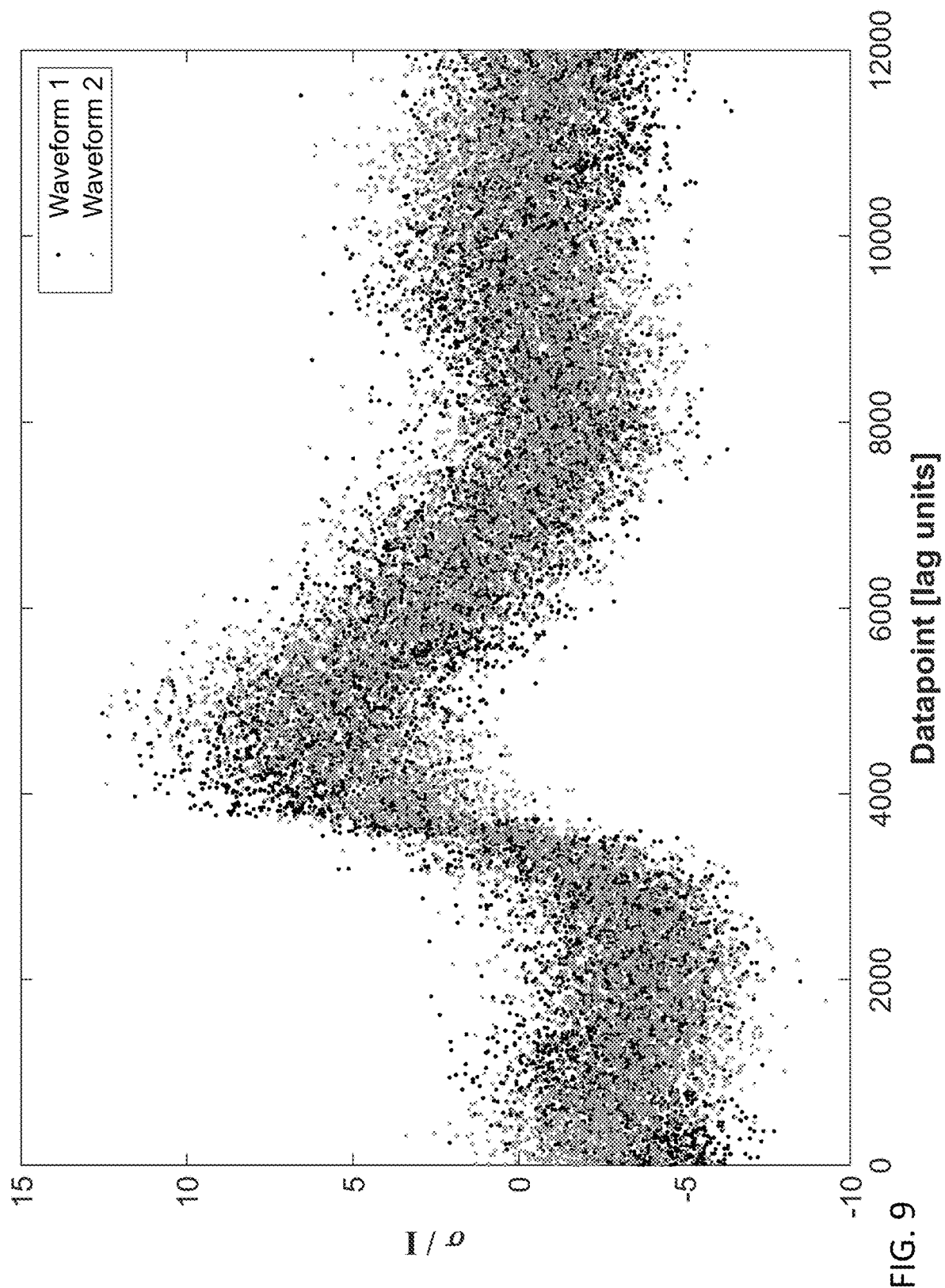
FIG. 9 is a graph of the data of FIG. 8, with gaps between groups of data points removed, according to an embodiment of the present disclosure.

FIG. 9 is a graph of the data of FIG. 8, with the gaps removed, i.e., the data of FIG. 9 consists of (i) a first array including all of the data points calculated for rows of the first sensor, uniformly spaced with a spacing equal to the row lag time (2.5 microseconds), of the data for FIG. 8, in the order in which they appear in FIG. 8, and (ii) a second array including all of the data points calculated for rows of the second sensor, uniformly spaced with a spacing equal to the row lag time, in the order in which they appear in FIG. 8.

As used herein, an "array cross-correlation" means a cross-correlation of a first array of data points and a second array of data points, where first array of data points and a second array of data points includes data points obtained at sampling times that are not uniformly spaced in time, and where the cross-correlation is calculated as though each array represents data points uniformly spaced time, with the data points in the first array having the same time spacing as the data points in the second array. As used herein, a "time cross-correlation" means a cross-correlation of a first array of data points and a second array of data points, where each array represents data points uniformly spaced time, with the data points in the first array having the same time spacing as the data points in the second array. As used herein, a "cross-correlation" is either an array cross-correlation or a time cross-correlation.

Figure 10A:
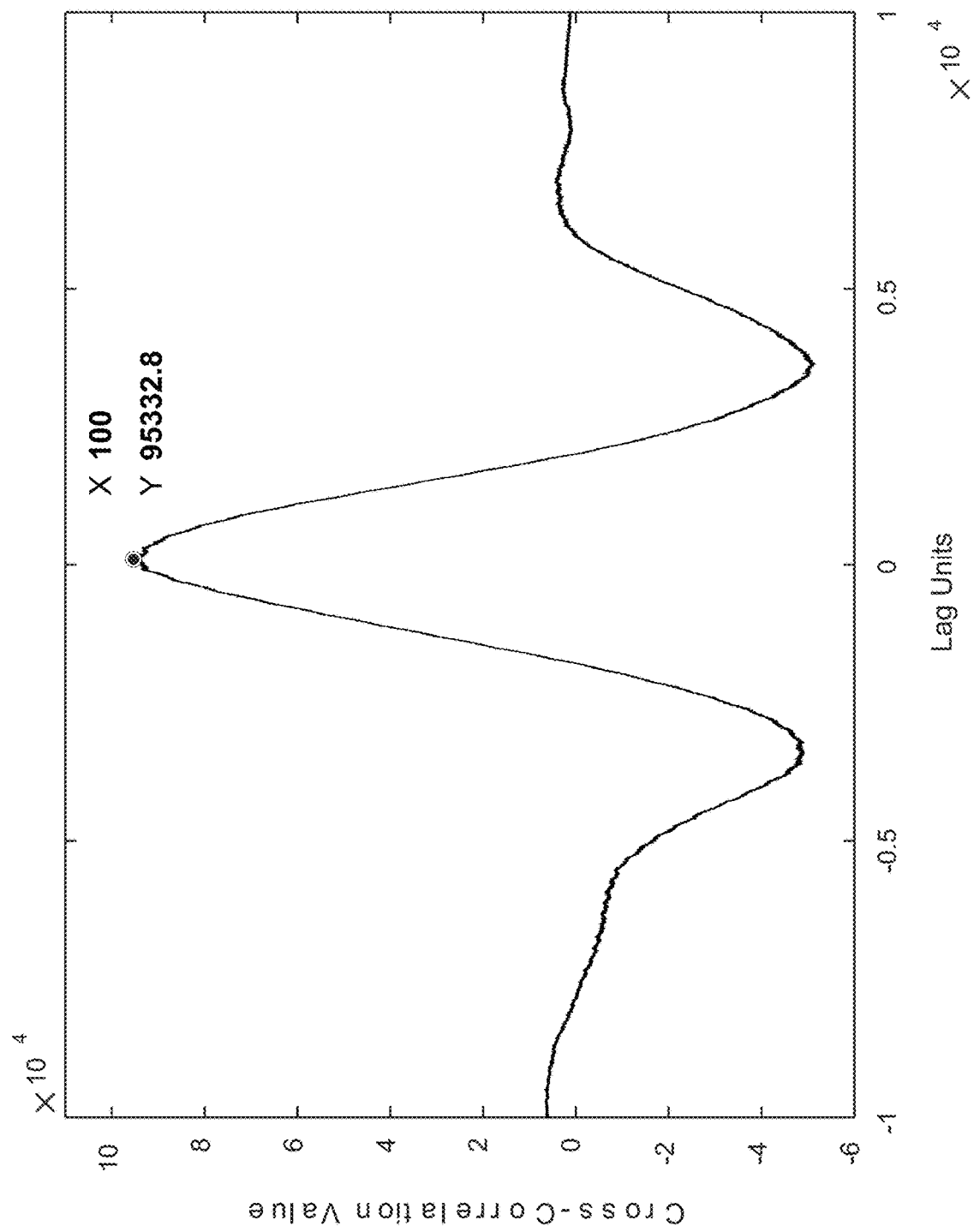
FIG. 10A is a graph of an array cross-correlation, according to an embodiment of the present disclosure.
Figure 10B:
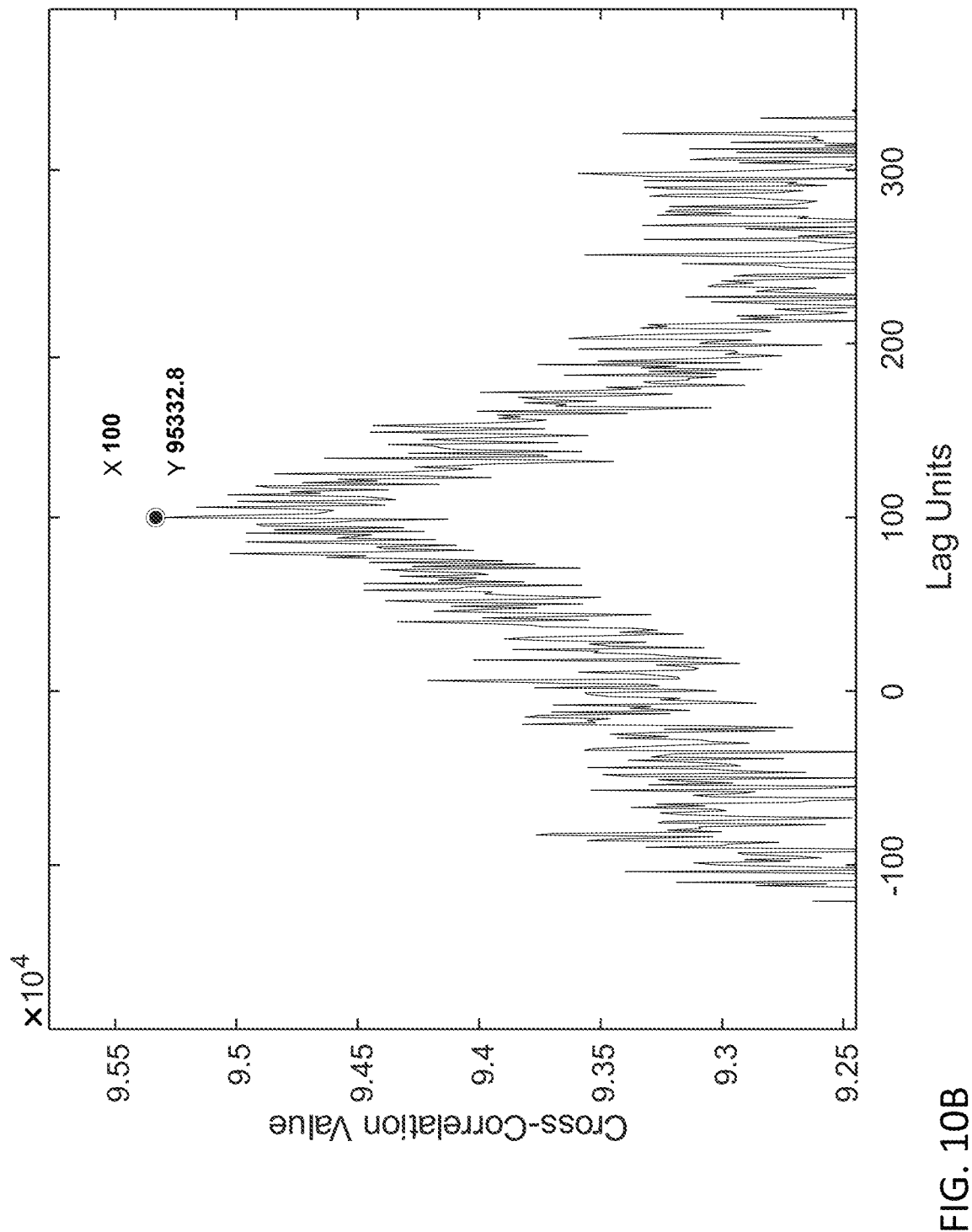
FIG. 10B is an enlarged view of the peak of FIG. 10A, according to an embodiment of the present disclosure.

The array cross-correlation of these two arrays is shown in FIGS. 10A and 10B (with FIG. 10B being an enlarged view of the peak of FIG. 10A (which has coordinates X=100, Y=95332.8)). The peak is sufficiently narrow, for the data of FIG. 9, to estimate its location within 25 microseconds with, e.g., a quadratic fitting method suitable for determining peak position of a correlation function.

Figure 11A:
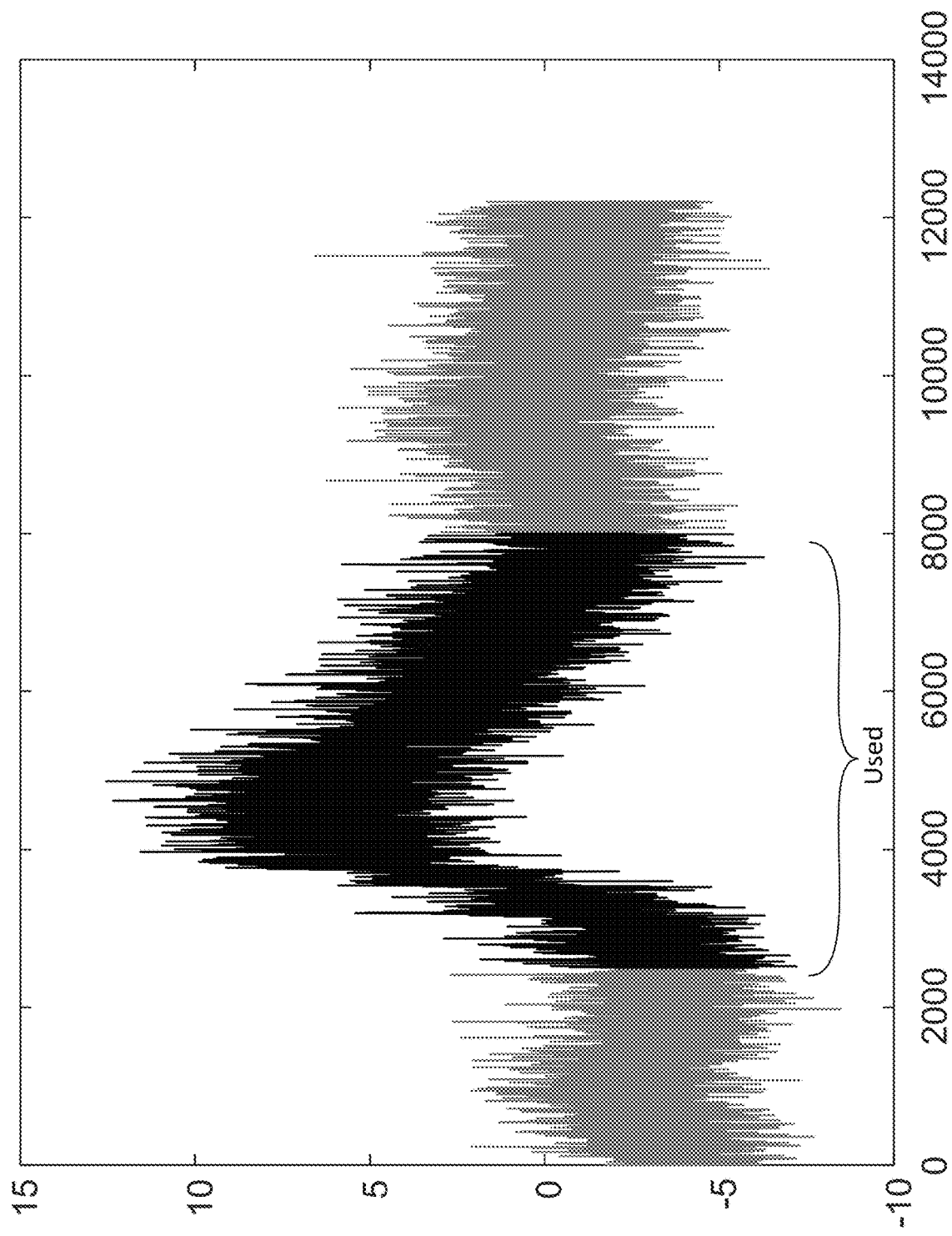
FIG. 11A is a graph of a simulated pulse, according to an embodiment of the present disclosure.
Figure 11B:
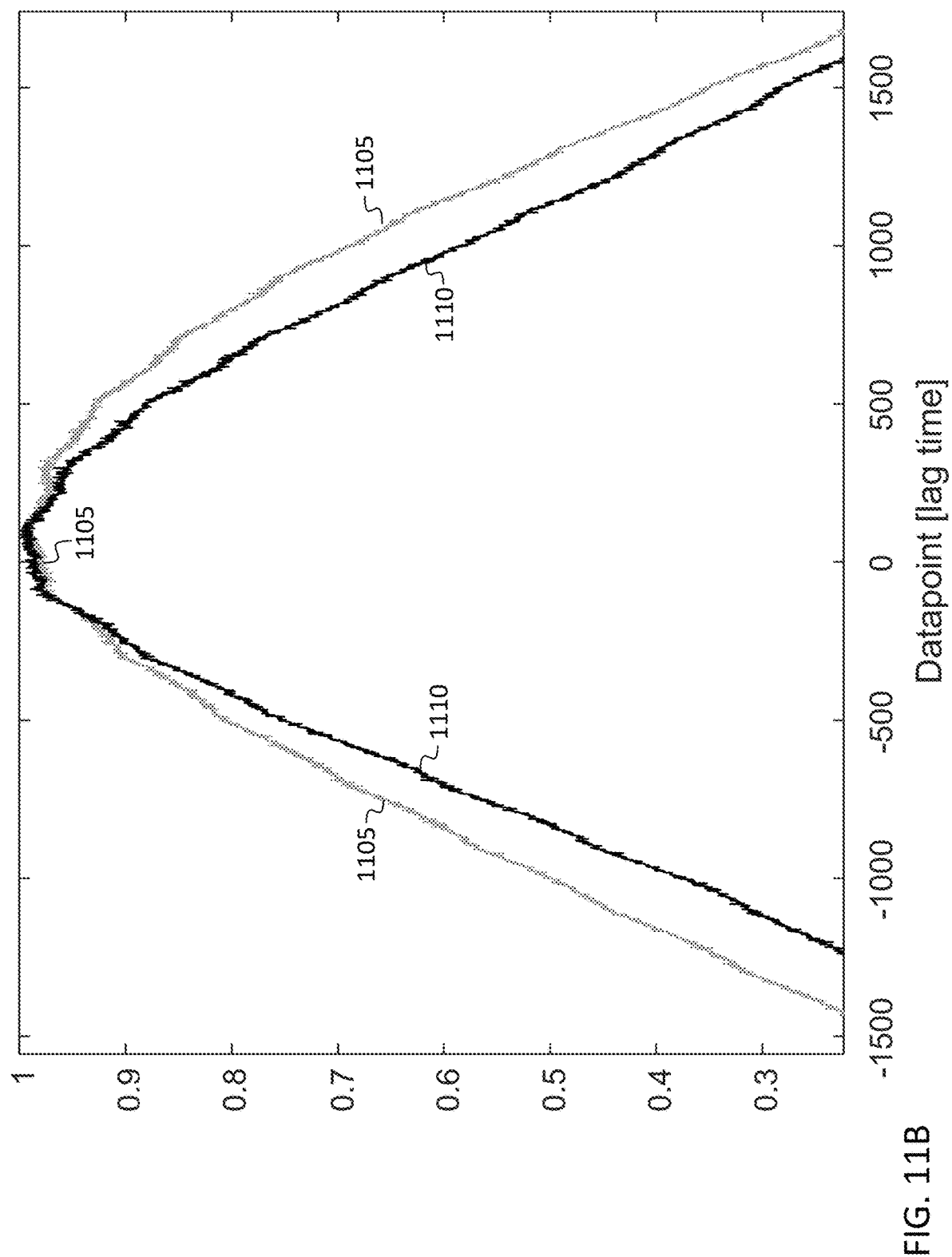
FIG. 11B is a graph of samples of the simulated pulse of FIG. 11A used for calculating an array correlation, according to an embodiment of the present disclosure.

In some embodiments, as illustrated in FIGS. 11A and 11B, the precision of the delay estimate obtained from the array cross-correlation may be improved by discarding, in the set of data points from each image sensor 210, data points (e.g., values of the normalized standard deviation, one value from each row) that are not near an estimated position of the systolic peak. In some embodiments, an initial estimate of the position of the systolic peak is obtained, and then the data filtering thresholds may be determined for subsequent pulses to improve results. As illustrated in FIG. 11A, a portion of the data (e.g., a contiguous set of data points including (e.g., centered on) an estimated position of the systolic peak, or a set of data points including a first data point at a first distance from the estimated position of the systolic peak and excluding a second data point at a second distance from the estimated position of the systolic peak, the second distance being greater than the first distance) may be used to calculate the cross-correlation, and the remainder may be discarded. The number of data points that are not discarded may be between 5% and 95% of the total number of data points The peaks in the cross-correlation, when (i) all of the data points are used (shown in a first curve 1105) and (ii) when a portion of the data points are discarded (as shown in FIG. 11A) (shown in a second curve 1110) are shown in FIG. 11B, in which the narrowing of the peak that results from discarding some of the data points is apparent.

Figure 12A:
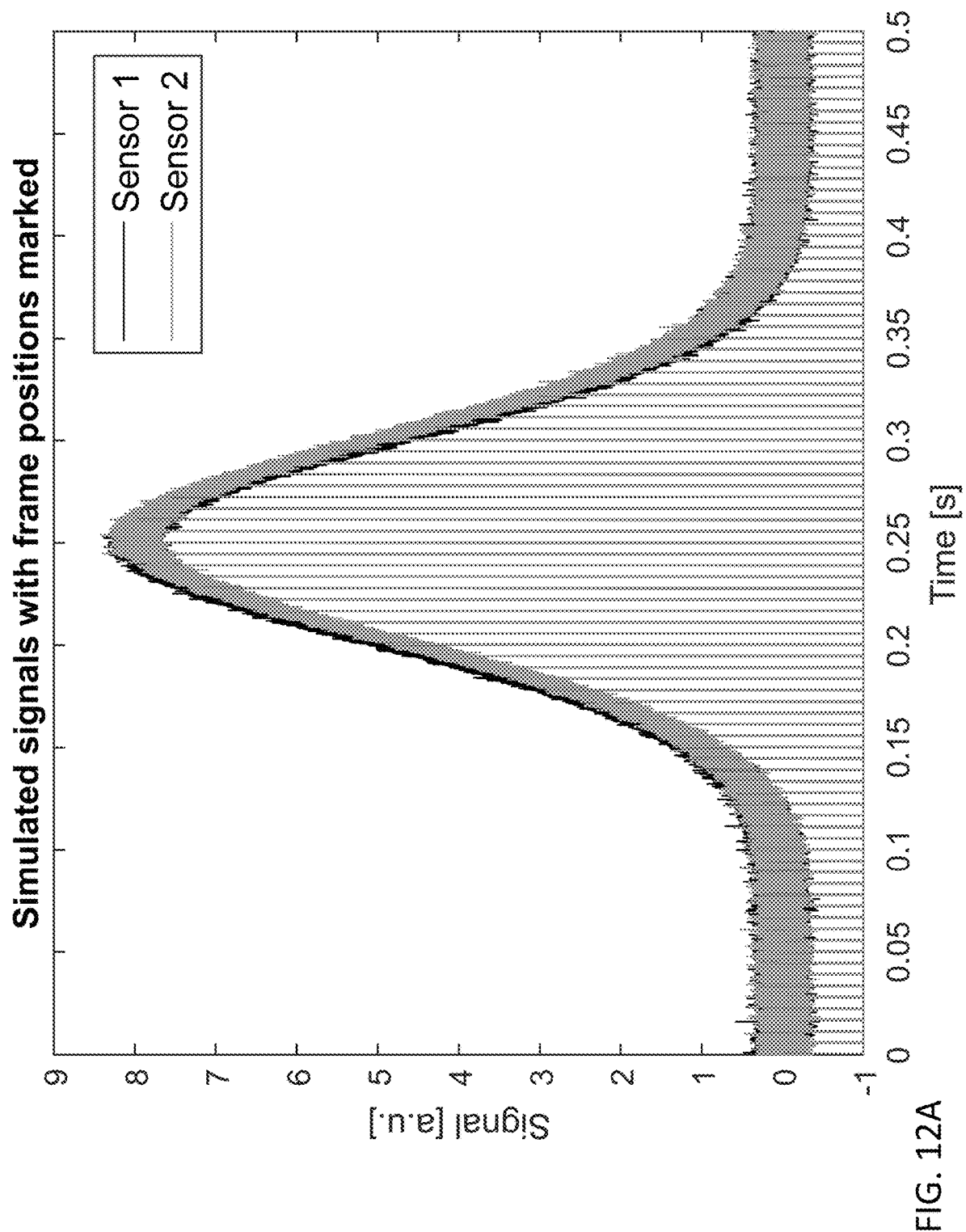
FIG. 12A is a graph of two Gaussian peaks used for a simulation, according to an embodiment of the present disclosure.
Figure 12B:
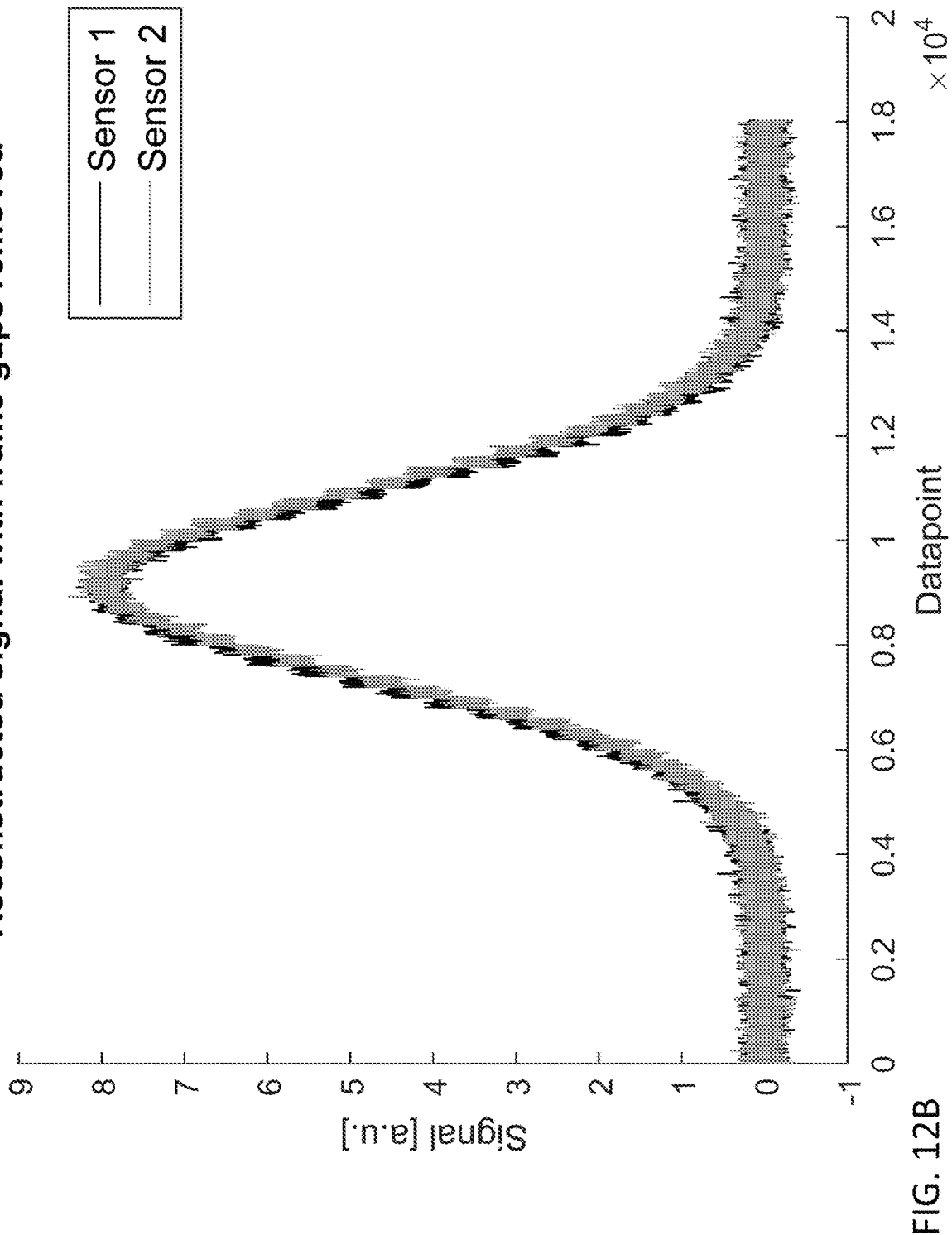
FIG. 12B is a graph of data used to calculate an array cross-correlation, according to an embodiment of the present disclosure.

Simulations may be used to assess the performance of a pulse wave velocity sensor, in some embodiments. FIG. 12A shows two noisy Gaussian pulses, (Gaussian pulses with pseudorandom noise superimposed on them), that were used to approximate, in a simulation, the systolic pulse that might be measured in two optodes of a pulse wave velocity sensor, respectively, at different times because of delay resulting from the pulse transit time between the two optodes. Vertical bars in the graph show the frame positions (corresponding to a frame rate of 180 frames per second), i.e., the intervals of time during each of which an exposure is performed and the rows are read out. The gaps between the vertical bars correspond to the dead time between frames. FIG. 12B shows the data of FIG. 12A, sampled during the frames, and with the data corresponding to the gaps (i.e., corresponding to detector dead time) removed, so that (as is the case for the data of FIG. 9) the data points of FIG. 12B are nonuniformly spaced in time.

Figure 12C:
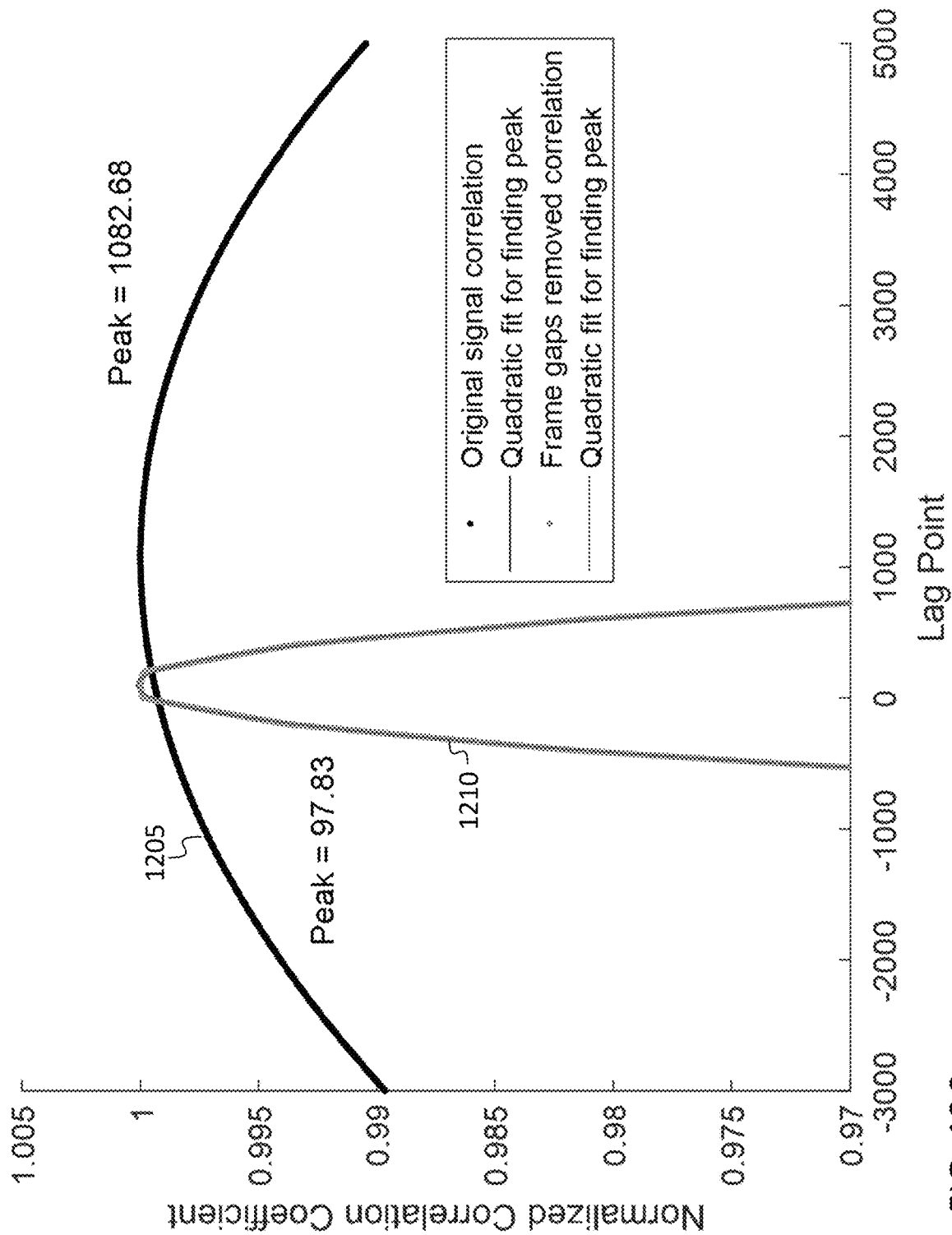
FIG. 12C is a graph of two cross-correlations and corresponding quadratics, according to an embodiment of the present disclosure.

FIG. 12C shows, in a first pair of curves 1205, (i) the normalized correlation coefficient for the two noisy Gaussian pulses of FIG. 12A (including the data points that are in the gaps between frames) and (ii) a quadratic fit to the data (which, on the scale of the graph, is essentially the same as the normalized correlation coefficient), and, in a second pair of curves 1210, (iii) the normalized correlation coefficient resulting from the array cross-correlation of the frame-sampled data of FIG. 12B, and (iv) a quadratic fit to the array cross-correlation. In this example the peaks of the two quadratics occur at 1082.68 and at 97.83 respectively, in units of sample number.

The ratio of 1082.68 to 97.83 is 1082.68/97.83=11.07. For a row lag time of t_row=2.5e-6 seconds, with 200 rows used in the analysis, and approximately 2222 samples per frame (corresponding to a sampling rate of 2.5 microseconds per sample and the frame rate of 180 frames per second), the correlation correction coefficient may be calculated as 2222/200=11.11. The product of (i) the peak (97.83) of the fit to the array cross-correlation and (ii) the correlation correction coefficient is then 1087, which is within about 0.4% of the peak of the quadratic fit to the normalized correlation coefficient for the two noisy Gaussian pulses of FIG. 12A.

In some embodiments, the capture time offset is adjusted in operation (e.g., in real time) to be equal or nearly equal to the pulse transit time. For example, for a separation between optodes of 25 mm, the capture time offset may initially be set to 2.5 ms, corresponding to a pulse wave velocity of 10 m/s. If a pulse transit time of 2.3 ms is then measured (as the peak of the cross-correlation), the capture time offset may be adjusted to 2.3 ms. In some embodiments, each image sensor 210 is operated at the maximum frame rate possible, e.g., so that there is no dead time between frames, and the frame period is equal to the total of the time required to perform the reset, the exposure, and the readout.

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, when a second quantity is "within Y" of a first quantity X, it means that the second quantity is at least X-Y and the second quantity is at most X+Y. As used herein, when a second number is "within Y %" of a first number, it means that the second number is at least (1−Y/100) times the first number and the second number is at most (1+Y/100) times the first number. As used herein, the word "or" is inclusive, so that, for example, "A or B" means any one of (i) A, (ii) B, and (iii) A and B.

Each of the terms "processing circuit" and "means for processing" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

As used herein, the term "array" refers to an ordered set of numbers regardless of how stored (e.g., whether stored in consecutive memory locations, or in a linked list). As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory as) the second quantity.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Similarly, a range described as "within 35% of 10" is intended to include all subranges between (and including) the recited minimum value of 6.5 (i.e., (1−35/100) times 10) and the recited maximum value of 13.5 (i.e., (1+35/100) times 10), that is, having a minimum value equal to or greater than 6.5 and a maximum value equal to or less than 13.5, such as, for example, 7.4 to 10.6. Any maximum numerical limitation recited herein is intended to include all lower numerical limitations subsumed therein and any minimum numerical limitation recited in this specification is intended to include all higher numerical limitations subsumed therein.

Although exemplary embodiments of a system and method for measuring pulse wave velocity have been specifically described and illustrated herein, many modifications and variations will be apparent to those skilled in the art. Accordingly, it is to be understood that a system and method for measuring pulse wave velocity constructed according to principles of this disclosure may be embodied other than as specifically described herein. The invention is also defined in the following claims, and equivalents thereof.

What is claimed is:

1. A system, comprising:
    a pulse timing sensor, comprising:
       a first wearable speckleplethysmography sensor; and
       a second wearable speckleplethysmography sensor,
    the first wearable speckleplethysmography sensor being configured to measure a blood flow velocity at a first point, on a first artery, and
    the second wearable speckleplethysmography sensor being configured to measure a blood flow velocity at a second point on a second artery,
    wherein a first image sensor of the first wearable speckleplethysmography sensor is a zero chief ray angle image sensor.

2. The system of claim 1,
    wherein the second wearable speckleplethysmography sensor comprises a second image sensor.

3. The system of claim 2, wherein the first wearable speckleplethysmography sensor comprises two lasers.

4. The system of claim 2, wherein the first wearable speckleplethysmography sensor comprises two image sensors.

5. The system of claim 2, further comprising a processing circuit,
wherein:
    the first wearable speckleplethysmography sensor comprises two lasers or two image sensors, and
    the processing circuit is configured to select, for use, a first combination, of a laser and an image sensor, of the first wearable speckleplethysmography sensor, based on a signal quality of the first combination.

6. The system of claim 5, wherein:
    the second wearable speckleplethysmography sensor comprises two lasers or two image sensors, and
    the processing circuit is configured to select, for use, a second combination, of a laser of the second wearable speckleplethysmography sensor and an image sensor of the second wearable speckleplethysmography sensor, based on a signal quality of the second combination.

7. The system of claim 6, wherein:
    the first artery is the same artery as the second artery; and
    the processing circuit is further configured to calculate a path length along the artery based on:
       a location of the laser of the first combination and a location of the image sensor of the first combination and
       a location of the laser of the second combination and a location of the image sensor of the second combination.

8. The system of claim 2, further comprising a housing containing the pulse timing sensor, the housing being sized and dimensioned to fit on a wrist of a subject, over a radial artery of the subject.

9. The system of claim 2, wherein the first image sensor is a rolling-shutter image sensor.

10. The system of claim 9, wherein a speckle size at the first image sensor is smaller than a size of a pixel of the first image sensor.

11. The system of claim 9, wherein the second image sensor is a rolling-shutter image sensor.

12. The system of claim 11, wherein a speckle size at the second image sensor is smaller than a size of a pixel of the second image sensor.

13. The system of claim 9, wherein the system is configured to estimate a pulse wave velocity based on a first plurality of data points, from the first wearable speckleplethysmography sensor, and a second plurality of data points, from the second wearable speckleplethysmography sensor.

14. The system of claim 13, wherein a data point of the first plurality of data points is based on a standard deviation of a plurality of pixel values of pixels of a row of the first image sensor.

15. The system of claim 13, wherein the system is configured to estimate the pulse wave velocity based on a cross-correlation of the first plurality of data points and the second plurality of data points.

16. The system of claim 15, wherein the cross-correlation is an array cross-correlation.

17. The system of claim 2, wherein the first image sensor is configured to operate at a frame rate between 50 Hz and 1 KHz.

18. The system of claim 1,
    wherein the first image sensor is a rolling shutter image sensor configured to operate with a row lag time of less than 50 microseconds.

19. The system of claim 2, wherein a distance between the first point and the second point is greater than 5 mm and less than 40 mm.

20. The system of claim 2, wherein the first artery is a different artery from the second artery.

\* \* \* \* \*